(12) United States Patent
Wu et al.

(10) Patent No.: US 12,504,663 B2
(45) Date of Patent: Dec. 23, 2025

(54) DISPLAY PANELS AND MANUFACTURING METHODS THEREOF, DISPLAY DEVICES AND SPLICED DISPLAY DEVICES

(71) Applicants: Beijing BOE Display Technology Co., Ltd., Beijing (CN); BOE Technology Group Co., Ltd., Beijing (CN)

(72) Inventors: Bin Wu, Beijing (CN); Wei Zhong, Beijing (CN); Xiaodi Sun, Beijing (CN); Haijun Shi, Beijing (CN); Bochang Wang, Beijing (CN); Chunguang Tian, Beijing (CN); Hongbo Feng, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/898,191

(22) Filed: Sep. 26, 2024

(65) Prior Publication Data

US 2025/0020961 A1 Jan. 16, 2025

Related U.S. Application Data

(63) Continuation of application No. 18/024,046, filed as application No. PCT/CN2021/126718 on Oct. 27, 2021, now Pat. No. 12,169,341.

(30) Foreign Application Priority Data

Mar. 31, 2021 (CN) .......................... 202110352204.1

(51) Int. Cl.
*G02F 1/1345* (2006.01)
*G02F 1/133* (2006.01)
(Continued)

(52) U.S. Cl.
CPC ........ *G02F 1/1345* (2013.01); *G02F 1/13306* (2013.01); *G02F 1/133314* (2021.01); *G02F 1/133531* (2021.01); *G02F 1/136209* (2013.01)

(58) Field of Classification Search
CPC ............. G02F 1/1345; G02F 1/133531; G02F 1/133314; G02F 1/13306; G02F 1/136209
See application file for complete search history.

(56) References Cited

U.S. PATENT DOCUMENTS 11,822,177 B2 * 11/2023 Itakura ............... G02F 1/133331
2013/0027857 A1 * 1/2013 Jeong ................. G02F 1/133512
361/679.01

FOREIGN PATENT DOCUMENTS

CN 107479229 A 12/2017
CN 215181289 U 12/2021

* cited by examiner

*Primary Examiner* — Michael H Caley
*Assistant Examiner* — David Y Chung
(74) *Attorney, Agent, or Firm* — IPro, PLLC

(57) ABSTRACT

Provided are a display panel and a manufacturing method thereof, a display device and a spliced display device. The display panel includes: a color filter substrate (11), an array substrate (12) and a first conductive portion (13), where a display region (AA) and a peripheral region (NA) are formed on the display panel, and the peripheral region (NA) surrounds the display region (AA); the array substrate (12) includes pixel circuits and a second conductive portion (14), where the pixel circuits are located in the display region (AA), and the second conductive portion (14) is located in the peripheral region (NA); the second conductive portion (14) is connected with the pixel circuits; the first conductive portion (13) is located on a side surface of the array substrate (12) and a side surface of the color filter substrate (11), and the first conductive portion (13) is connected with the (Continued)

second conductive portion (14). By such technical solutions, a width of the peripheral region can be reduced, which is beneficial to realizing a narrow bezel and increasing a screen-to-body ratio.

20 Claims, 12 Drawing Sheets

(51) Int. Cl.
  *G02F 1/1333* (2006.01)
  *G02F 1/1335* (2006.01)
  *G02F 1/1362* (2006.01)

DISPLAY PANELS AND MANUFACTURING METHODS THEREOF, DISPLAY DEVICES AND SPLICED DISPLAY DEVICES

CROSS-REFERENCE TO RELATED APPLICATIONS

This application is a continuation application of U.S. patent application Ser. No. 18/024,046 filed on Feb. 28, 2023, which claims priority to Chinese patent application No. 202110352204.1 filed on Mar. 31, 2021, both of which are incorporated herein by reference in their entireties.

TECHNICAL FIELD

The present application relates to the field of display technologies, and in particular, to a display panel and a manufacturing method thereof, a display device and a spliced display device.

BACKGROUND

In the related art, with continuous integration and development of display and control technologies, super-large pictures, multi-screen display, and clear and realistic display effects make command monitoring, commercial centers, high-level conferences, private theaters and other industries more inclined to select ultra-large-size display screens. However, in the field of large-screen display system engineering, costs for manufacturing ultra-large-size display screens of more than 100 inches are much higher than that for manufacturing large-size display screens of 55 inches, etc., and due to limitations of technologies and equipment, a maximum size of a single liquid crystal display screen is 110 inches. Therefore, a display device formed by splicing a plurality of screens has appeared.

However, since liquid crystals in a liquid crystal display panel have fluidity, the liquid crystals needs to be sealed within a specific region by using a sealant, and positions of the sealant cannot be used for display. Moreover, in a glass cutting process, a certain distance needs to be reserved for grinding of the display panel, so as to ensure that a pixel region of the display panel can display normally. This causes a "seam" that cannot be completely eliminated in a spliced liquid crystal display screen. How to reduce a width of the "seam" is a technical problem that needs to be solved.

SUMMARY

The present disclosure provides a display panel and a manufacturing method thereof, a display device and a spliced display device.

According to a first aspect of embodiments of the present disclosure, there is provided a display panel, including: a color filter substrate, an array substrate and a first conductive portion, where a display region and a peripheral region are formed on the display panel, and the peripheral region surrounds the display region;

the color filter substrate is opposite to the array substrate;
the array substrate includes pixel circuits and a second conductive portion, where the pixel circuits are located in the display region, and the second conductive portion is located in the peripheral region; the second conductive portion is connected with the pixel circuits; the pixel circuits and the second conductive portion are located on a side of the array substrate facing the color filter substrate; and
the first conductive portion is located on a side surface of the array substrate and a side surface of the color filter substrate, a first end of the first conductive portion is located on the side surface of the color filter substrate, a second end of the first conductive portion is located on the side surface of the array substrate, and the first conductive portion is connected with the second conductive portion.

In an embodiment, a distance between the first end of the first conductive portion and the second end of the first conductive portion is smaller than a distance between a first surface of the color filter substrate away from the array substrate and a second surface of the array substrate away from the color filter substrate.

In an embodiment, the first conductive portion is located between a first central axis of the side surface of the color filter substrate and a second central axis of the side surface of the array substrate; the first central axis and the second central axis are respectively perpendicular to a direction from the first end of the first conductive portion to the second end of the first conductive portion.

In an embodiment, the first conductive portion is manufactured through a transfer printing process; a distance between the first end of the first conductive portion and the first central axis is a first distance, and a distance between the second end of the first conductive portion and the second central axis is a second distance, where the first distance is equal to the second distance.

In an embodiment, the display panel further includes: chip-on-films, where the chip-on-films are bonded together with the first conductive portion, and the chip-on-films are electrically connected with the first conductive portion.

In an embodiment, the display panel further includes: a conductive film layer, where the conductive film layer is located between the first conductive portion and the chip-on-films, and the first conductive portion is in electrical communication with the chip-on-films through the conductive film layer.

In an embodiment, the first conductive portion includes a plurality of first conductive portions, and the conductive film layer covers all the first conductive portions;
the plurality of first conductive portions include a plurality of central conductive portions and a plurality of edge conductive portions, where the central conductive portions are located in middle of the plurality of first conductive portions, and the edge conductive portions are located in edges of the plurality of first conductive portions; and
the chip-on-films are connected with the plurality of central conductive portions through the conductive film layer.

In an embodiment, the display panel further includes: a printed circuit board, where the printed circuit board is located on a side of the chip-on-films away from the array substrate, and is connected with the chip-on-films.

In an embodiment, a width of part of a chip-on-film located near the printed circuit board is smaller than a width of part of the chip-on-film located near the array substrate.

In an embodiment, a light emitting side of the color filter substrate and a light incident side of the array substrate are respectively attached with a polarizer.

In an embodiment, the display panel further includes: a first polarizer and a second polarizer, where the first polarizer is located on a side of the color filter substrate away from the array substrate, and the second polarizer is located on a side of the array substrate away from the color filter substrate;

the color filter substrate includes a first edge and a second
edge, where the first edge is located on a first side of the
color filter substrate, and the second edge is located on
a second side of the color filter substrate, where the
second side is a side other than the first side, and the
first conductive portion is located on the first side of the
color filter substrate;

a distance between a third edge of the first polarizer
located on the first side and the first edge is 0.05~1.7
mm, and the third edge is parallel to the first edge; a
distance between a fourth edge of the first polarizer
located on the second side and the second edge is 0~0.1
mm, and the fourth edge is parallel to the second edge;

the array substrate includes a fifth edge and a sixth edge,
where the fifth edge is located on the first side of the
array substrate, and the sixth edge is located on the
second side of the array substrate; and a distance between a seventh edge of the second polarizer
located on the first side and the fifth edge is 0.1~1.7
mm, and the seventh edge is parallel to the fifth edge;
a distance between an eighth edge of the second
polarizer located on the second side and the sixth edge
is 0~0.1 mm, and the eighth edge is parallel to the sixth
edge.

In an embodiment, the display panel further includes: a
first light shielding layer, a second light shielding layer, a
first water and oxygen barrier layer, and a second water and
oxygen barrier layer, where the color filter substrate includes a first edge region and a
first central region, where the first edge region surrounds the first central region; a projection of the first
polarizer on the color filter substrate is located within
the first central region;

the first light shielding layer is located on a side of the
color filter substrate facing the first polarizer, and the
first light shielding layer is located in the first edge
region and covers side surfaces of the first polarizer; the
first water and oxygen barrier layer covers the first light
shielding layer;

the array substrate includes a second edge region and a
second central region, where the second edge region
surrounds the second central region; a projection of the
second polarizer on the array substrate is located within
the second central region; and the second light shielding layer is located on a side of the
array substrate facing the second polarizer, and the
second light shielding layer is located in the second
edge region and covers side surfaces of the second
polarizer; the second water and oxygen barrier layer
covers the second light shielding layer.

In an embodiment, the color filter substrate includes a
third light shielding layer and a fourth light shielding layer;

the peripheral region includes a first sub-region and a
second sub-region, where the first sub-region is located
between the display region and the first conductive
portion, and the second sub-region is a region other
than the first sub-region in the peripheral region;

a projection of the third light shielding layer on the array
substrate is located within the first sub-region, and a
projection of the fourth light shielding layer on the
array substrate is located within the second sub-region;
and a width of the third light shielding layer is 0.6~1.0 mm,
and a width of the fourth light shielding layer is
0.25~0.5 mm.

According to a second aspect of the embodiments of the
present disclosure, there is provided a display device,
including: a light emitting module and the above-described
display panel, where the display panel is located on a light emitting side of the
light emitting module, and the array substrate is located
between the color filter substrate and the light emitting
module.

In an embodiment, the light emitting module includes a
back plate, a middle frame, an optical film layer and a light
plate, where the back plate includes a bottom plate and a side wall; the
light plate is located on a side of the bottom plate facing
the display panel, and includes a plurality of light
sources; the middle frame is disposed around the plurality of light sources, and is fixedly connected with the
side wall; the middle frame is located between the
bottom plate and the optical film layer.

In an embodiment, a projection of the optical film layer on
the color filter substrate is located within a projection of the
array substrate on the color filter substrate, and a projection
of the middle frame on the array substrate is located within
a projection of the optical film layer on the array substrate.

In an embodiment, the display device further includes: a
fifth light shielding layer and a metal layer, where the fifth light shielding layer is located on a side surface
of the color filter substrate and a side surface of the
array substrate;

the metal layer covers the fifth light shielding layer, and
is located on a side surface of the light emitting module;
when the display panel includes a first polarizer, a first
end of the metal layer is located on a side of the first
polarizer away from the color filter substrate and
located in the peripheral region, and a second end of the
metal layer is located on a side of the light emitting
module away from the display panel.

In an embodiment, on a first side of the optical film layer,
in a first direction, a distance between an edge of the optical
film layer and the metal layer is a third distance, and a
distance between the middle frame and the edge of the
optical film layer is a fourth distance, where the first
direction is parallel to a surface of the optical film layer
facing the display panel, the third distance is equal to the
fourth distance, and the third distance is 0.3~0.5 mm; and on a second side of the optical film layer, in the first
direction, the distance between the edge of the optical
film layer and the metal layer is a fifth distance, and the
distance between the middle frame and the edge of the
optical film layer is a sixth distance, where the sixth
distance is greater than or equal to the fifth distance, the
fifth distance is 0.1~0.3 mm, and the sixth distance is
0.3~0.5 mm.

In an embodiment, on a first side of the bottom plate, the
middle frame includes a first side surface and a second side
surface, where the first side surface is connected with the
second side surface, the first side surface is an inclined plane
inclined from the peripheral region to the display region, and
the second side surface extends along a second direction, the
second direction is perpendicular to a surface of the optical
film layer facing the display panel;

when the display panel includes chip-on-films, each of the
chip-on-films includes a chip and a flexible circuit
board, where the chip is fixed on the flexible circuit
board; and the display panel further includes a printed circuit board,
where the printed circuit board is located on a side of the chip-on-films away from the array substrate, and is connected with the chip-on-films.

In an embodiment, on the first side of the bottom plate, the side wall includes a first vertical extension portion, a first horizontal extension portion and a second vertical extension portion, where the first vertical extension portion is connected with the bottom plate, and extends along the second direction; the first horizontal extension portion is located between the first vertical extension portion and the second vertical extension portion; an extension direction of the first horizontal extension portion is perpendicular to the second direction, and the first horizontal extension portion extends in a direction from the display region to the peripheral region; the second vertical extension portion extends along the second direction; and the light emitting module further includes a support block, where the support block is located at a connection between the first vertical extension portion and the first horizontal extension portion, and the support block is located between the first vertical extension portion and the printed circuit board for supporting the printed circuit board.

In an embodiment, the light emitting module further includes a protection plate for protecting the printed circuit board; and the protection plate is located on a side of the printed circuit board away from the support block, and the protection plate, the middle frame and the back plate are fixed together.

In an embodiment, the protection plate includes a first protection portion and a second protection portion, where the first protection portion is connected with the second protection portion, the first protection portion extends along the second direction, the printed circuit board is located between the first protection portion and the support block, an extension direction of the second protection portion is perpendicular to the second direction, and the second protection portion is located on a side of the printed circuit board away from the display panel;

the middle frame includes a first support portion, a second support portion and a third support portion, where the second support portion is located between the first support portion and the third support portion, the first support portion is located on the bottom plate, an extension direction of the first support portion is perpendicular to the second direction, the second support portion extends along the second direction, and the third support portion is configured to support the optical film layer;

the light emitting module further includes a first fastener, where the first fastener passes through the second vertical extension portion, the third support portion and the first protection portion; and a first support point of the third support portion to the optical film layer, a second support point of the second support portion to the third support portion, and a contact point between the third support portion and the first fastener are vertexes of a mechanical triangle.

In an embodiment, the third support portion includes a third side surface, a fourth side surface and a fifth side surface, where the third side surface, the fourth side surface and the fifth side surface face the optical film layer, the fourth side surface is located between the third side surface and the fifth side surface, the third side surface is a plane for supporting the optical film layer, an angle between the fourth side surface and a surface of the optical film layer facing the middle frame is an acute angle, and the fifth side surface is a convex arc surface;

a width of the third side surface in a first direction is 0.2~0.3 mm, the first direction is perpendicular to the second direction, the angle between the fourth side surface and the surface of the optical film layer facing the middle frame is 23~33 degrees, and a radius of a sphere where the convex arc surface is located is 10~15 mm; and the second support portion includes a sixth side surface, where the sixth side surface is located on a side of the second support portion facing the optical film layer, and the sixth side surface is a plane.

In an embodiment, the light emitting module further includes a first reflective film layer, where the first reflective film layer is located on a surface of the middle frame facing the optical film layer;

the first reflective film layer covers the fifth side surface, a part of the fourth side surface and a part of the sixth side surface;

on a side of the middle frame close to the optical film layer, there exists a gap between the first reflective film layer and the third side surface, and on a side of the middle frame close to the bottom plate, there exists a gap between the first reflective film layer and the first support portion; and the first reflective film layer is a reflective sticker or a white film layer.

In an embodiment, on the side of the middle frame close to the optical film layer, a distance between the first reflective film layer and the third side surface is 2.5 to 5 mm, and on the side of the middle frame close to the bottom plate, a distance between the first reflective film layer and the first support portion is less than or equal to 2 mm.

In an embodiment, there are four middle frames; every two of the four middle frames are adjacent to each other, and the four middle frames enclose a quadrilateral; and two adjacent middle frames are fixedly connected with each other.

In an embodiment, the light emitting module further includes an embedded corner block, where the embedded corner block is configured to fixedly connect two adjacent middle frames;

the embedded corner block includes a first connection portion and a second connection portion, where the first connection portion is connected with the second connection portion, and an extension direction of the first connection portion intersects with an extension direction of the second connection portion; and the first connection portion is fixedly connected with one of the two adjacent middle frames, and the second connection portion is fixedly connected with the other one of the two adjacent middle frames.

In an embodiment, one of the two adjacent middle frames includes a first groove, and the other one of the two adjacent middle frames includes a second groove; and the first connection portion is located in the first groove, and a depth of the first groove is the same as a thickness of the first connection portion; the second connection portion is located in the second groove, and a depth of the second groove is the same as a thickness of the second connection portion.

In an embodiment, one of the two adjacent middle frames includes a first positioning hole, and the other one of the two adjacent middle frames includes a second positioning hole; and the first connection portion includes a first positioning column, and the second connection portion includes a second positioning column, where the first positioning column is located in the first positioning hole, and the second positioning column is located in the second positioning hole.

In an embodiment, an opening is formed on a side close to the bottom plate between the two adjacent middle frames.

In an embodiment, the light emitting module further includes a second reflective film layer, where the second reflective film layer is located at a connection between the two adjacent middle frames, and a width of the second reflective film layer increases in a direction from the optical film layer to the bottom plate.

In an embodiment, the plurality of light sources are arranged in an array, and a light source array formed by the plurality of light sources is symmetrical.

In an embodiment, the light source array includes M rows of light sources arranged along the first direction, and N rows of light sources arranged along a third direction, where M and N are integers greater than 6 respectively, and the first direction intersects with the third direction;

in the first direction, a light distance between a first light source and a second light source is a first light distance, a light distance between the second light source and a third light source is a second light distance, a light distance between an $(N-2)^{th}$ light source and an $(N-1)^{th}$ light source is the second light distance, a light distance between the $(N-1)^{th}$ light source and an $N^{th}$ light source is the first light distance, and a light distance between two adjacent light sources in remaining light sources is a third light distance, where the second light distance is greater than the third light distance, and the third light distance is greater than the first light distance;

in the third direction, a light distance between a first light source and a second light source is a fourth light distance, a light distance between the second light source and a third light source is a fifth light distance, a light distance between an $(N-2)^{th}$ light source and an $(N-1)^{th}$ light source is the fifth light distance, a light distance between the $(N-1)^{th}$ light source and an Nth light source is the fourth light distance, and a light distance between two adjacent light sources in remaining light sources is the third light distance, where the fifth light distance is greater than the third light distance, and the third light distance is greater than the fourth light distance.

In an embodiment, in any one of the first direction and the third direction, a distance between a side of the first reflective film layer on the second support portion facing the optical film layer and a light source adjacent to the second support portion is a seventh distance, a distance between the side of the first reflective film layer on the second support portion facing the optical film layer and an edge of the optical film layer close to the middle frame is an eighth distance, a projection of a surface of the second support portion facing the optical film layer on the optical film layer is a projection point, an acute angle between the second direction and a line between the light source adjacent to the second support portion and the projection point is a first angle, the second direction is perpendicular to the surface of the optical film layer facing the display panel, an acute angle between the second direction and a line between the light source adjacent to the second support portion and a connection point of the second support portion and the third support portion is a second angle, and a reflectance of a surface of the third support portion facing the optical film layer, a luminous flux per unit angle of the light source at different angles of light emission, the seventh distance, the eighth distance, the first angle and the second angle satisfy the following relationship:

$$\frac{a}{b} \approx \frac{\int_0^\alpha x\,dr}{\int_\alpha^\beta fx\,dr}$$

where a is a value of the seventh distance, b is a value of the eighth distance, α is a value of the first angle, β is a value of the second angle, x is the luminous flux, and r is an angle of light emission.

In an embodiment, the display device further includes: a third reflective film layer, where the third reflective film layer is located on a side of the light plate facing the optical film layer, and is pressed on a bottom end of the first support portion.

In an embodiment, a top end surface of the middle frame is coated with a hot melt adhesive/optical curable adhesive for fixing an edge of the optical film layer to the top end surface of the middle frame; and when the display panel includes a second polarizer, and the second polarizer is located on a side of the array substrate away from the color filter substrate, an edge of the second polarizer is coated with the optical curable adhesive for fixing the array substrate and the color filter substrate on the optical film layer.

In an embodiment, the hot melt adhesive includes a resin material, and a transmittance of the hot melt adhesive is 80%~99.5%; and the optical curable adhesive includes the resin material, and a transmittance of the optical curable adhesive is 80%~99.5%.

In an embodiment, the optical film layer includes a light transmitting glass plate, a light diffusing film and a brightness enhancement film, where the light diffusing film is located on a side of the light transmitting glass plate away from the array substrate, and the brightness enhancement film is located on a side of the light transmitting glass plate facing the array substrate.

According to a third aspect of the embodiments of the present disclosure, there is provided a spliced display device, including: at least two display devices, and at least one of the at least two display devices is the above-described display device.

According to a fourth aspect of the embodiments of the present disclosure, there is provided a method of manufacturing a display panel, where a display region and a peripheral region are formed on the display panel, and the peripheral region surrounds the display region; and the method includes:

forming an array substrate, where the array substrate include pixel circuits and a second conductive portion, the pixel circuits are located in the display region, the second conductive portion is located in the peripheral region, and the second conductive portion is connected with the pixel circuits;

forming a color filter substrate;

cell-assembling on the array substrate and the color filter substrate, where the pixel circuits and the second conductive portion are located on a side of the array substrate facing the color filter substrate; and forming a first conductive portion on a side surface of the array substrate and a side surface of the color filter substrate, where a first end of the first conductive portion is located on the side surface of the color filter substrate, a second end of the first conductive portion is located on the side surface of the array substrate, and the first conductive portion is connected with the second conductive portion.

In an embodiment, forming the first conductive portion on the side surface of the array substrate and the side surface of the color filter substrate includes:

manufacturing the first conductive portion; and transfer printing the first conductive portion on the side surface of the array substrate and the side surface of the color filter substrate through a transfer printing process.

DETAILED DESCRIPTION OF THE EMBODIMENTS

To make the above-mentioned objects, features and advantages of the present disclosure more clearly understood, specific embodiments of the present disclosure will be described in detail below with reference to the accompanying drawings.

Figure 1:
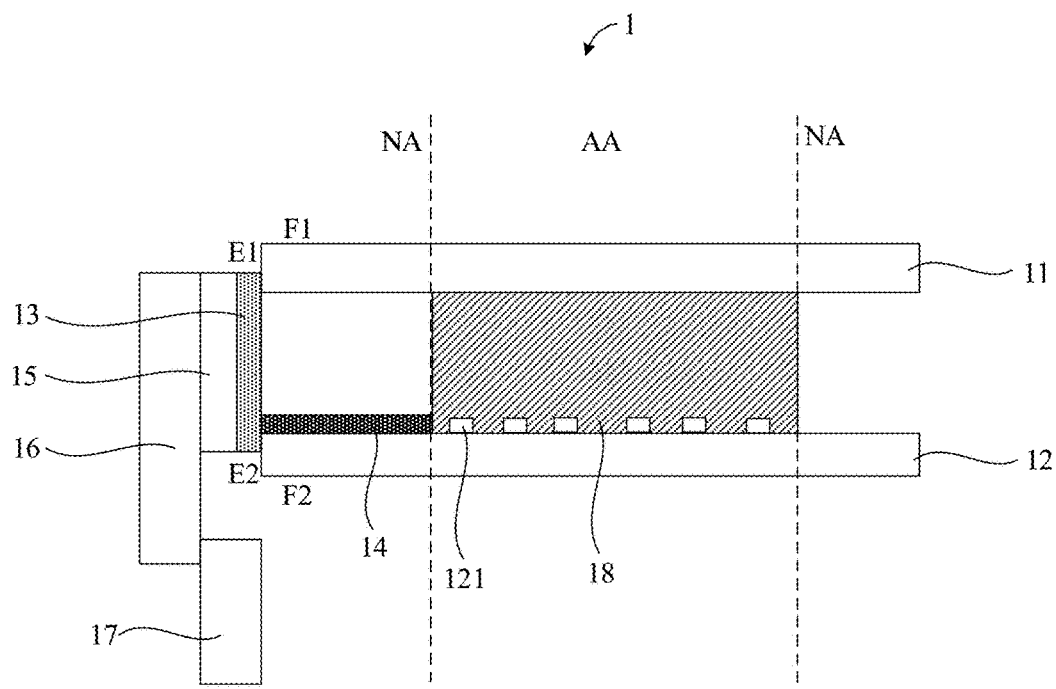
FIG. 1 is a schematic structural diagram illustrating a display panel according to an embodiment of the present disclosure.

An embodiment of the present disclosure provides a display panel 1. As shown in FIG. 1, the display panel 1 includes a color filter/film substrate 11, an array substrate 12 and a first conductive portion 13. A display region AA and a peripheral region NA are formed on the display panel 1, and the peripheral region NA surrounds the display region AA.

In this embodiment, as shown in FIG. 1, the color filter substrate 11 is opposite to the array substrate 12. The array substrate 12 includes pixel circuits 121 and a second conductive portion 14, where the pixel circuits are located in the display region AA, and the second conductive portion 14 is located in the peripheral region NA. The second conductive portion 14 is connected with the pixel circuits, and the pixel circuits and the second conductive portion 14 are located on a side of the array substrate 12 facing the color filter substrate 11.

In this embodiment, as shown in FIG. 1, the first conductive portion 13 is located on a side surface of the array substrate 12 and a side surface of the color filter substrate 11. A first end E1 of the first conductive portion 13 is located on the side surface of the color filter substrate 11, a second end E2 of the first conductive portion 13 is located on the side surface of the array substrate 12, and the first conductive portion 13 is connected with the second conductive portion 14.

In this embodiment, since the first conductive portion 13 is provided on the side surface of the array substrate 12 and the side surface of the color filter substrate 11, and the first conductive portion 13 is connected with the pixel circuits through the second conductive portion 14, the pixel circuits can be connected with a chip for controlling the pixel circuits through the first conductive portion 13. And since the first conductive portion 13 is located on the side surface of the array substrate 12 and the side surface of the color filter substrate 11, a space on the array substrate 12 located in the peripheral region NA can be avoided from being occupied, and a width of the peripheral region NA can be reduced, which is beneficial to realizing a narrow bezel and increasing a screen-to-body ratio. By applying the display panel 1 to display devices in a spliced display device, a seam between two adjacent display devices in the spliced display device can be reduced.

The display panel 1 provided by the embodiment of the present disclosure has been introduced briefly above, and will be introduced in detail below.

Figure 2:
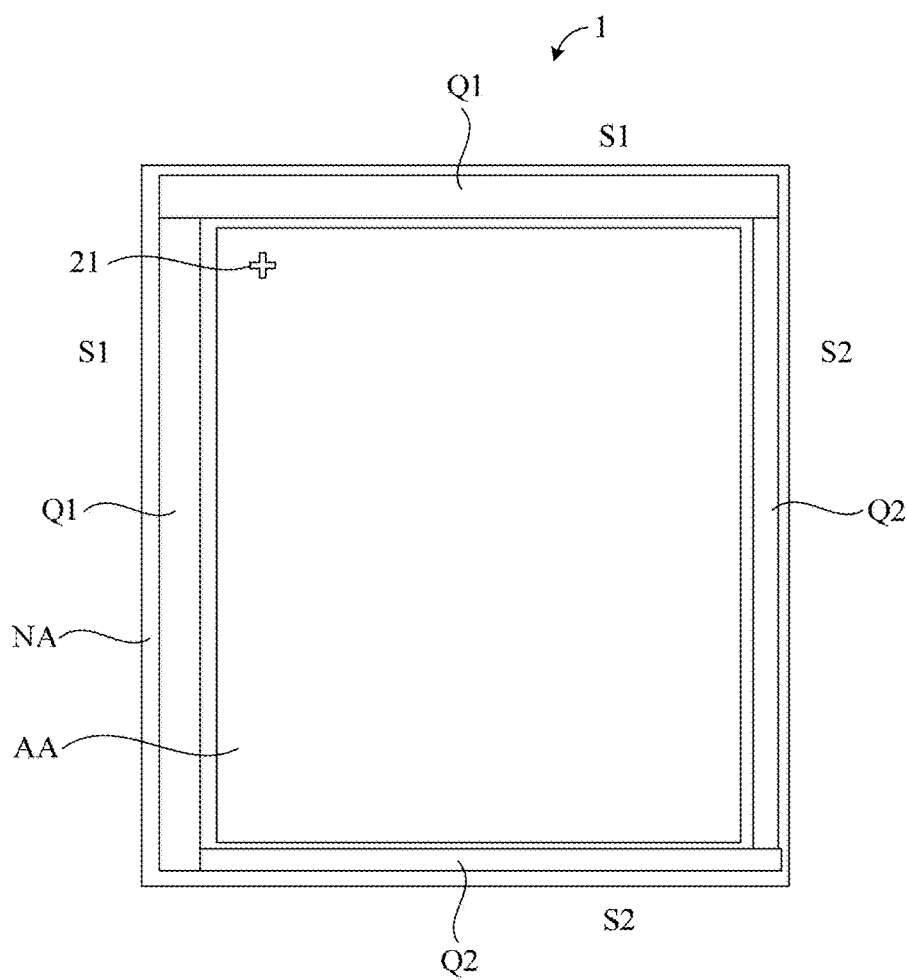
FIG. 2 is a schematic structural diagram illustrating another display panel according to an embodiment of the present disclosure.

An embodiment of the present disclosure provides a display panel 1. As shown in FIG. 1 and FIG. 2, the display panel 1 includes a display region AA and a peripheral region NA, where the peripheral region NA surrounds the display region AA.

In this embodiment, as shown in FIG. 1, the display panel 1 further includes a color filter substrate 11, an array substrate 12, a liquid crystal layer 18, a second conductive portion 14, a first conductive portion 13, a conductive film layer 15, Chip-on-films (COFs) 16 and a printed circuit board 17.

As shown in FIG. 1, the color filter substrate 11 is opposite to the array substrate 12, and the liquid crystal layer 18 is located between the color filter substrate 11 and the array substrate 12.

In this embodiment, as shown in FIG. 1, the array substrate 12 includes pixel circuits 121 and the second conductive portion 14. The pixel circuits are located in the display region AA, and are configured to control a deflection angle of liquid crystal molecules in the liquid crystal layer 18 and thus an intensity of light transmitting through the liquid crystal layer 18. The second conductive portion 14 is located in the peripheral region NA, and the second conductive portion 14 is connected with the pixel circuits. The second conductive portion 14 may be made of metal materials, such as copper, but are not limited thereto. The pixel circuits and the second conductive portion 14 are located on a side of the array substrate 12 facing the color filter substrate 11. The second conductive portion 14 may be manufactured in the process of manufacturing the pixel circuits. For example, the second conductive portion 14 may be formed in a same layer and in one process step as source electrodes or drain electrodes of transistors in the pixel circuits.

In this embodiment, the pixel circuits can drive pixels to emit light under the control of gate driving signals and data driving signals. Generally, the gate driving signals can be provided by gate driving chips, and the data driving signals can be provided by data driving chips. Therefore, the display panel 1 further needs to be provided with the gate driving chips and the data driving chips.

Figure 3:
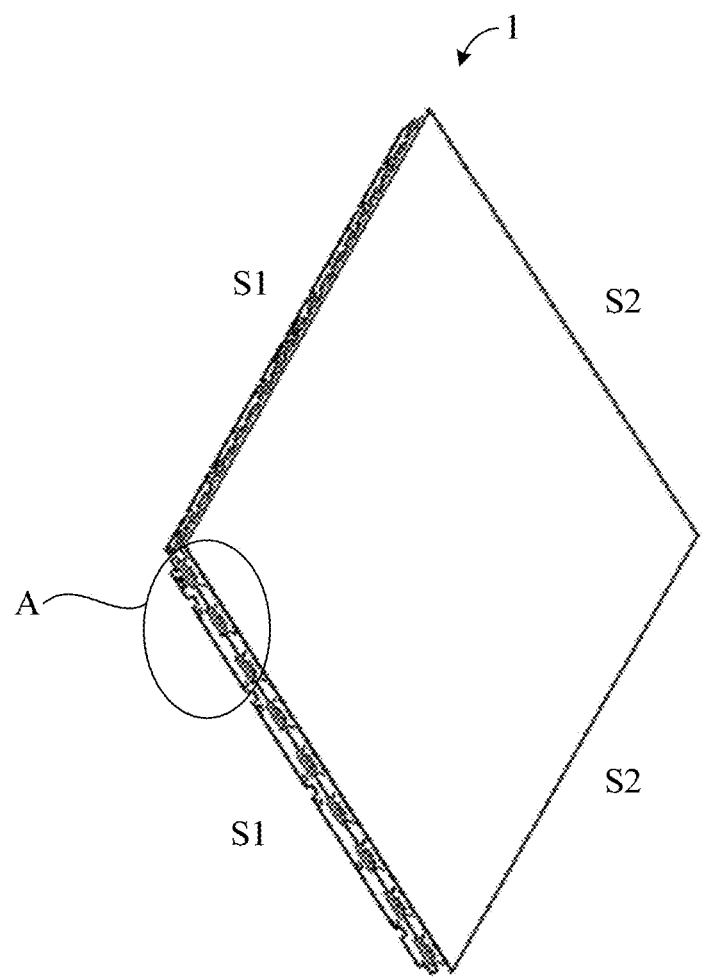
FIG. 3 is a schematic structural diagram illustrating another display panel according to an embodiment of the present disclosure.

In this embodiment, as shown in FIG. 3, the display panel 1 may be a rectangle, including four sides: two first sides S1 and two second sides S2, where one of the two first sides S1 is provided with the gate driving chips, and the other one of the two first sides S1 is provided with the data driving chips. The two second sides S2 may not be provided with a gate driving chip or a data driving chip.

In this embodiment, to reduce a width of the peripheral region NA, the gate driving chips and the data driving chips are respectively fixed on flexible circuit boards, and the gate driving chips and the data driving chips are electrically connected with the pixel circuits through the flexible circuit boards. Then the gate driving chips and the data driving chips are respectively disposed on a side of the display panel 1 away from the pixel circuits by bending the flexible circuit boards. A flexible circuit board on which a gate driving chip or a data driving chip is fixed may be referred to as a COF 16. Since a solution of disposing the gate driving chips on the side of the display panel 1 away from the pixel circuits is similar to that of disposing the data driving chips on the side of the display panel 1 away from the pixel circuits, to avoid content redundancy, disposing the gate driving chips on the side of the display panel 1 away from the pixel circuits will be taken as an example below for description.

Figure 4:
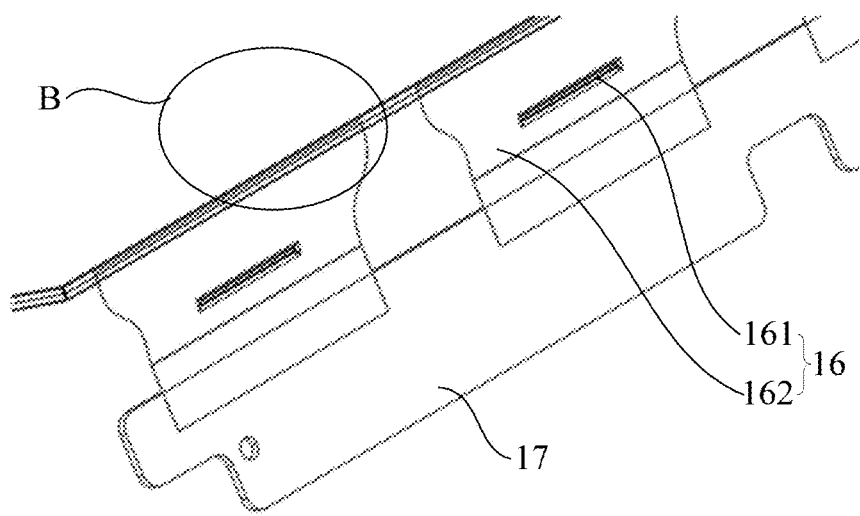
FIG. 4 is a schematic structural diagram illustrating another display panel according to an embodiment of the present disclosure.

In this embodiment, as shown in FIG. 4, a gate driving chip 161 is fixed on a flexible circuit board 162, and a COF 16 is formed after the gate driving chip 161 is fixed on the flexible circuit board 162. FIG. 4 is an enlarged schematic diagram of part A in FIG. 3.

In this embodiment, as shown in FIG. 1, the first conductive portion 13 is located on a side surface of the array substrate 12 and a side surface of the color filter substrate 11. A first end E1 of the first conductive portion 13 is located on the side surface of the color filter substrate 11, a second end E2 of the first conductive portion 13 is located on the side surface of the array substrate 12, and the first conductive portion 13 is connected with the second conductive portion 14. Therefore, the COFs 16 can be electrically connected with the pixel circuits through the first conductive portion 13 and the second conductive portion 14.

Figure 5:
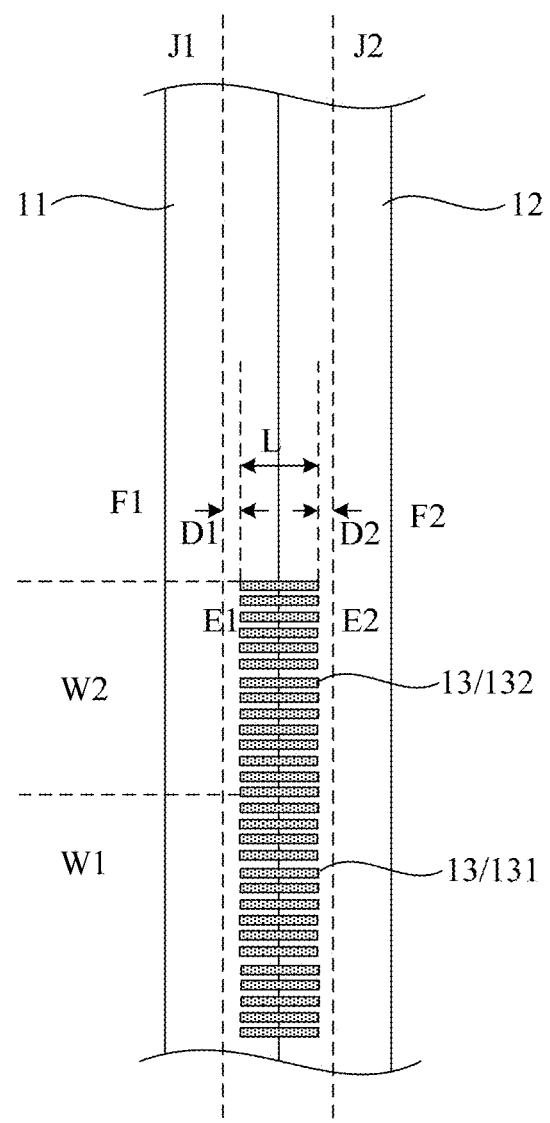
FIG. 5 is a schematic structural diagram illustrating another display panel according to an embodiment of the present disclosure.

In this embodiment, as shown in FIG. 1 and FIG. 5, a distance L between the first end E1 of the first conductive portion 13 and the second end E2 of the first conductive portion 13 is smaller than a distance between a first surface F1 of the color filter substrate 11 away from the array substrate 12 and a second surface F2 of the array substrate 12 away from the color filter substrate 11. That is, a length of the first conductive portion 13 is smaller than the distance between the first surface F1 and the second surface F2. FIG. 5 is an enlarged schematic diagram of part B in FIG. 4.

In this embodiment, as shown in FIG. 5, the first conductive portion 13 is located between a first central axis J1 of the side surface of the color filter substrate 11 and a second central axis J2 of the side surface of the array substrate 12. The first central axis J1 and the second central axis J2 are respectively perpendicular to a direction from the first end E1 of the first conductive portion 13 to the second end E2 of the first conductive portion 13. That is, the first central axis J1 and the second central axis J2 are respectively perpendicular to extension direction of the first conductive portion 13. In this way, uniform electrical contact between the first conductive portion 13 and the second conductive portion 14 can be ensured.

In this embodiment, as shown in FIG. 5, a distance between the first end E1 of the first conductive portion 13 and the first central axis J1 is a first distance D1, and a distance between the second end E2 of the first conductive portion 13 and the second central axis J2 is a second distance D2, where the first distance D1 is equal to the second distance D2.

In this embodiment, the first conductive portion 13 is made of metal materials, such as silver. The first conductive portion 13 and the second conductive portion 14 are formed in different process steps. The first conductive portion 13 may be manufactured through a transfer printing process.

In this embodiment, a thickness of the color filter substrate 11 may be substantially equal to that of the array substrate 12, both being 0.7 mm. And the distance L between the first end E1 of the first conductive portion 13 and the second end E2 of the first conductive portion 13 is 0.6 mm, that is, the length of the first conductive portion 13 is 0.6 mm. The first distance D1 between the first end E1 of the first conductive portion 13 and the first central axis J1 is 0.05 mm, and the second distance D2 between the second end E2 of the first conductive portion 13 and the second central axis J2 is 0.05 mm. In this way, uniform electrical contact between the first conductive portion 13 and the second conductive portion 14 can be ensured.

In this embodiment, as shown in FIG. 1, the conductive film layer 15 is located between the first conductive portion 13 and the COFs 16, the COFs 16 are bound/bonded together with the first conductive portion 13 through the conductive film layer 15, and the COFs 16 are electrically connected with the first conductive portion 13. That is, the first conductive portion 13 is in electrical communication with the COFs 16 through the conductive film layer 15. The conductive film layer 15 may be an Anisotropic Conductive Film (ACF), but is not limited thereto.

In this embodiment, as shown in FIG. 5, there are a plurality of first conductive portions 13. The conductive film layer 15 may cover all the first conductive portions 13. The plurality of first conductive portions 13 include a plurality of central conductive portions 131 and a plurality of edge conductive portions 132, where the central conductive portions 131 are located in middle W1 of the plurality of first conductive portions 13, and the edge conductive portions 132 are located in edges W2 of the plurality of first conductive portions 13. In this embodiment, the COFs 16 are connected with the plurality of central conductive portions 131 through the conductive film layer 15. There may be 15 edge conductive portions 132 on both sides of the plurality of central conductive portions 131 respectively, but are not limited thereto. The conductive film layer 15 may be coated with a boundary of the edge conductive portions 132 away from the central conductive portions 131 as reference. Thus, it can be avoided that a part of the central conductive portions 131, which play a conductive role, are not covered by the conductive film layer 15 and thus fail to play the conductive role.

Figure 6:
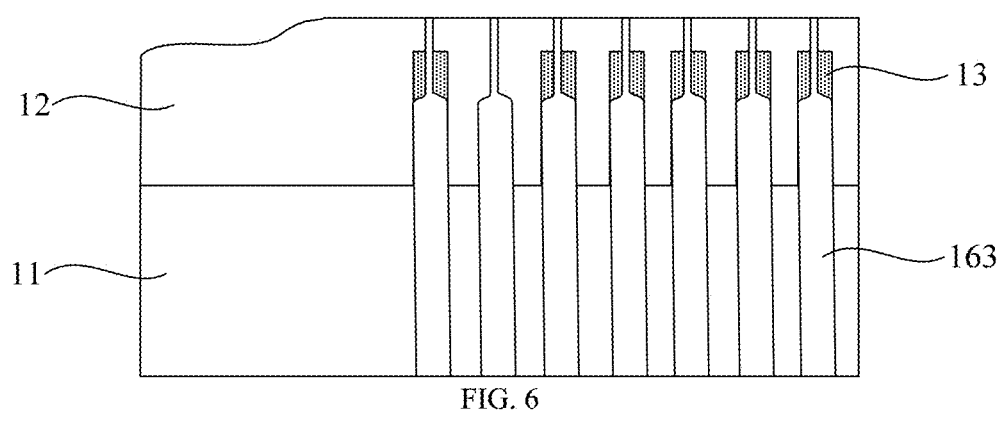
FIG. 6 is a schematic structural diagram illustrating another display panel according to an embodiment of the present disclosure.

In this embodiment, as shown in FIG. 6, a conductive portion 163 of the COF 16 is electrically connected with a corresponding first conductive portion 13. It should be noted that, at the edges W2 of the plurality of first conductive portions 13, there may exist a situation where a part of the first conductive portions 13 (edge conductive portions 132) are missing, but this does not affect electrical connection between the COFs 16 and the pixel circuits.

In this embodiment, when the COF 16 is bound/bonded to the first conductive portions 13, in the direction from the first end E1 of the first conductive portion 13 to the second end E2 of the first conductive portion 13, the binding can be performed in such a manner that the conductive portion 163 of the COF 16 exceeds the second end E2 of the first conductive portion 13 by a specified distance, so as to ensure that the conductive portion 163 of the COF 16 can be electrically connected with the corresponding first conductive portion 13 with a process error inclusive. The specified distance may be 0.1 mm, but is not limited thereto.

In this embodiment, as shown in FIG. 1 and FIG. 4, the printed circuit board 17 is located on a side of the COF 16 away from the array substrate 12, and is connected with the COF 16. A control chip may be bound/bonded on the printed circuit board 17, and the control chip is electrically connected with the gate driving chip on the COF 16 through the printed circuit board 17. The control chip is configured to control the gate driving chip.

In this embodiment, as shown in FIG. 4, a width of part of the COF 16 located close to the printed circuit board 17 is smaller than a width of part of the COF 16 located close to the array substrate 12. Thus, a larger assembly space can be reserved for a protection plate 89 configured to protect the printed circuit board 17, so as to ensure a fixing strength of the protection plate 89. The protection plate 89 can be attached to other nearby structures through screws. For example, the protection plate 89 can be attached to a middle frame 82 in a light emitting module through screws.

Figure 7A:
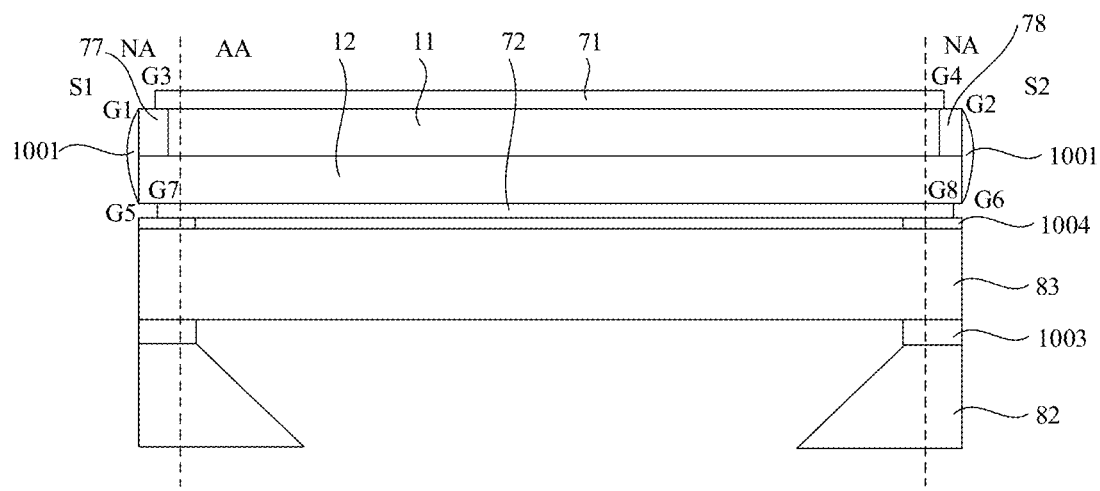
FIGS. 7A-7C are schematic structural diagrams illustrating another display panel according to an embodiment of the present disclosure.
Figure 7B:
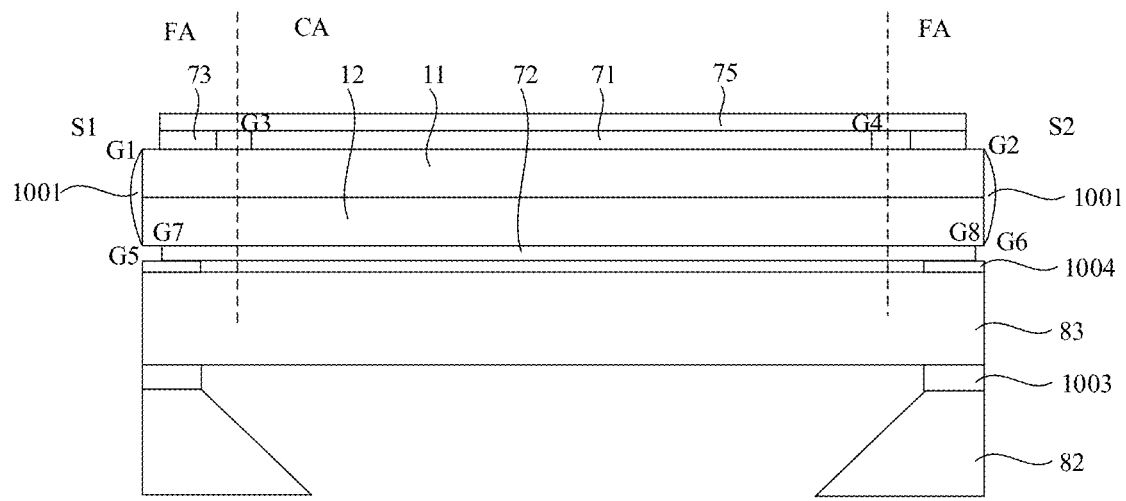
Figure 7C:
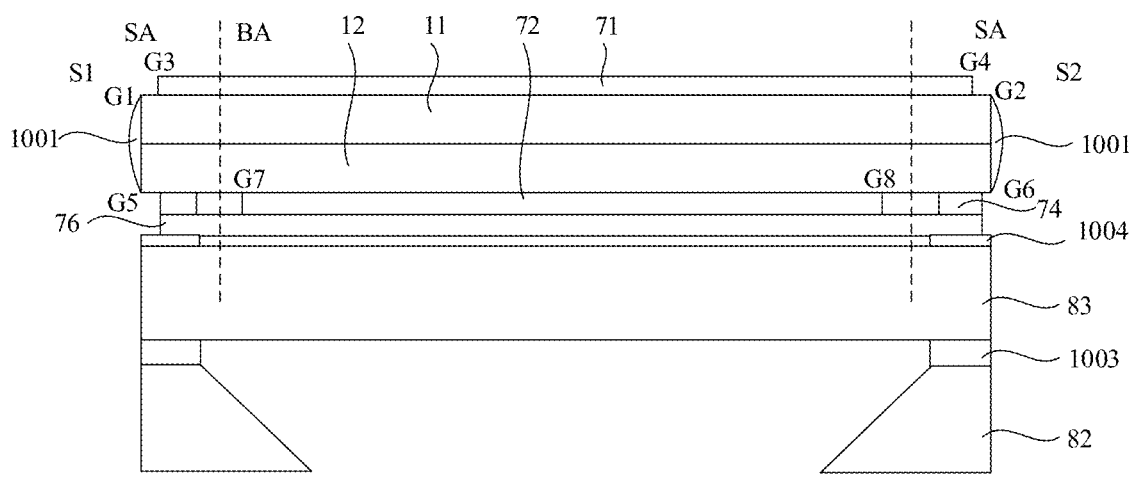

In this embodiment, as shown in FIGS. 7A-7C, the display panel 1 further includes a first polarizer 71, a second polarizer 72, a first light shielding layer 73, a second light shielding layer 74, a first water and oxygen barrier layer 75, and a second water and oxygen barrier layer 76.

In this embodiment, as shown in FIGS. 7A-7C, the first polarizer 71 is located on a side of the color filter substrate 11 away from the array substrate 12, and the second polarizer 72 is located on a side of the array substrate 12 away from the color filter substrate 11. The first polarizer 71 and the second polarizer 72 are configured to eliminate an influence of ambient light on display pictures. That is, a polarizer is respectively attached to a light emitting side of the color filter substrate 11 and a light incident side of the array substrate 12.

In this embodiment, as shown in FIGS. 7A-7C, the color filter substrate 11 includes a first edge G1 and a second edge G2, where the first edge G1 is located on a first side S1 of the color filter substrate 11, and the second edge G2 is located on a second side S2 of the color filter substrate 11. The second side S2 is a side other than the first side S1, and the first conductive portion 13 is located on the first side S1 of the color filter substrate 11.

In this embodiment, a distance between a third edge G3 of the first polarizer 71 located on the first side S1 and the first edge G1 is 0.05~1.7 mm, for example, 0.05 mm, 0.1 mm, 0.15 mm, 0.2 mm, 0.9 mm, 1.5 mm or 1.7 mm. The third edge G3 is parallel to the first edge G1. A distance between a fourth edge G4 of the first polarizer 71 located on the second side S2 and the second edge G2 is 0~0.1 mm, for example, 0 mm, 0.5 mm or 0.1 mm. The fourth edge G4 is parallel to the second edge G2.

In this embodiment, as shown in FIGS. 7A-7C, the array substrate 12 includes a fifth edge G5 and a sixth edge G6, where the fifth edge G5 is located on the first side S1 of the array substrate 12, and the sixth edge G6 is located on the second side S2 of the array substrate 12.

In this embodiment, a distance between a seventh edge G7 of the second polarizer 72 located on the first side S1 and the fifth edge G5 is 0.1~1.7 mm, for example, 0.1 mm, 0.3 mm, 0.4 mm, 0.9 mm, 1.5 mm or 1.7 mm. The seventh edge G7 is parallel to the fifth edge G5. A distance between an eighth edge G8 of the second polarizer 72 located on the second side S2 and the sixth edge G6 is 0~0.1 mm, for example, 0 mm, 0.05 mm or 0.1 mm. The eighth edge G8 is parallel to the sixth edge G6. A distance between an edge of each of the above polarizers and an edge of the display panel is not greater than a width of a non-display region in the display panel.

In this embodiment, the color filter substrate 11 includes a first edge region FA and a first central region CA, where the first edge region surrounds the first central region, and a projection of the first polarizer 71 on the color filter substrate 11 is located within the first central region. The first light shielding layer is located on a side of the color filter substrate 11 facing the first polarizer 71, and the first light shielding layer is located in the first edge region and covers side surfaces of the first polarizer 71. The first light shielding layer may be made of light shielding ink, but is not limited thereto. The first light shielding layer is configured to avoid light emitted by a light emitting module from leaking out of the third edge G3 and the fourth edge G4 of the first polarizer 71 to affect a quality of display pictures.

In this embodiment, the first water and oxygen barrier layer covers the first light shielding layer. The first water and oxygen barrier layer may be made of a fluorinating agent, but is not limited thereto. The first water and oxygen barrier layer is configured to block water and oxygen and protect the first polarizer 71, so as to avoid failure of microscopic regions of cut edges due to water vapor entering edges of the first polarizer 71.

In this embodiment, the array substrate 12 includes a second edge region SA and a second central region BA, where the second edge region surrounds the second central region, and a projection of the second polarizer 72 on the array substrate 12 is located within the second central region. The second light shielding layer is located on a side of the array substrate 12 facing the second polarizer 72, and the second light shielding layer is located in the second edge region, and covers side surfaces of the second polarizer 72. The second light shielding layer may be made of light shielding ink, but is not limited thereto. The second light shielding layer is configured to avoid light emitted by a light emitting module from leaking out of the seventh edge G7 and the eighth edge G8 of the second polarizer 72 to affect a quality of display pictures.

In this embodiment, the second water and oxygen barrier layer covers the second light shielding layer. The second water and oxygen barrier layer may be made of a fluorinating agent, but is not limited thereto. The second water and oxygen barrier layer is configured to block water and oxygen and protect the second polarizer 72, so as to avoid failure of microscopic regions of cut edges due to water vapor entering edges of the second polarizer 72.

In this embodiment, in high-temperature and high-humidity reliability tests, failure and light leakage problems caused by water vapor entering edges of the first polarizer 71 and the second polarizer 72 and a light leakage problem caused by shrinkage of the first polarizer 71 and the second polarizer 72 at the high temperature can be reduced.

In this embodiment, as shown in FIG. 2, the display panel 1 further includes an alignment mark 21, and the alignment mark 21 is located in the display region AA. For example, a projection of the alignment mark 21 on the array substrate 12 may be located within projection of sub-pixel in a first row and a second column on the array substrate 12, but is not limited thereto. Since the alignment mark 21 does not occupy a space of the peripheral region NA, it is beneficial to reducing a width of the peripheral region NA and increasing a screen-to-body ratio.

In this embodiment, as shown in FIG. 2, the peripheral region NA includes a first sub-region Q1 and a second sub-region Q2, where the first sub-region Q1 is located between the display region AA and the first conductive portion 13, and the second sub-region Q2 is a region other than the first sub-region Q1 in the peripheral region NA.

In this embodiment, the color filter substrate 11 includes a third light shielding layer 77 and a fourth light shielding layer 78. The third light shielding layer and the fourth light shielding layer may be black matrices in a same layer as a color filter/film (CF). A projection of the third light shielding layer on the array substrate 12 is located within the first sub-region Q1, and a projection of the fourth light shielding layer on the array substrate 12 is located within the second sub-region Q2.

In this embodiment, a width of the third light shielding layer is 0.6~1.0 mm, for example, 0.6 mm, 0.8 mm or 1.0 mm, and a width of the fourth light shielding layer is 0.25~0.5 mm, for example, 0.25 mm, 0.4 mm or 0.5 mm.

In this embodiment, since the first conductive portion 13 is provided on the side surface of the array substrate 12 and the side surface of the color filter substrate 11, and the first conductive portion 13 is connected with the pixel circuits through the second conductive portion 14, the pixel circuits can be connected with a chip for controlling the pixel circuits through the first conductive portion 13. And since the first conductive portion 13 is located on the side surface of the array substrate 12 and the side surface of the color filter substrate 11, a space on the array substrate 12 located in the peripheral region NA can be avoided from being occupied, and a width of the peripheral region NA can be reduced, which is beneficial to realizing a narrow bezel and increasing a screen-to-body ratio. Furthermore, the width of the peripheral region NA can be reduced to less than 1 mm. By applying the display panel 1 to display devices in a spliced display device, a seam between two adjacent display devices in the spliced display device can be reduced.

Figure 8:
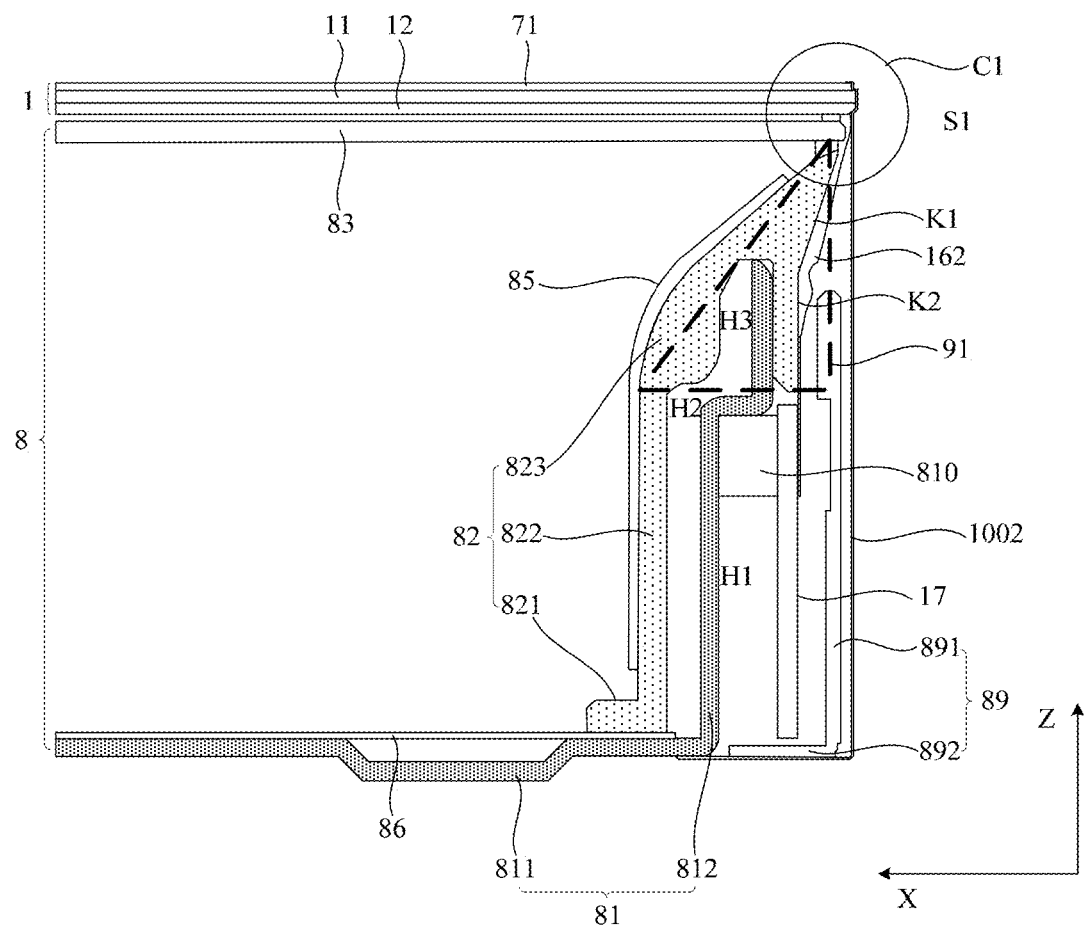
FIG. 8 is a schematic structural diagram illustrating a display device according to an embodiment of the present disclosure.
Figure 9:
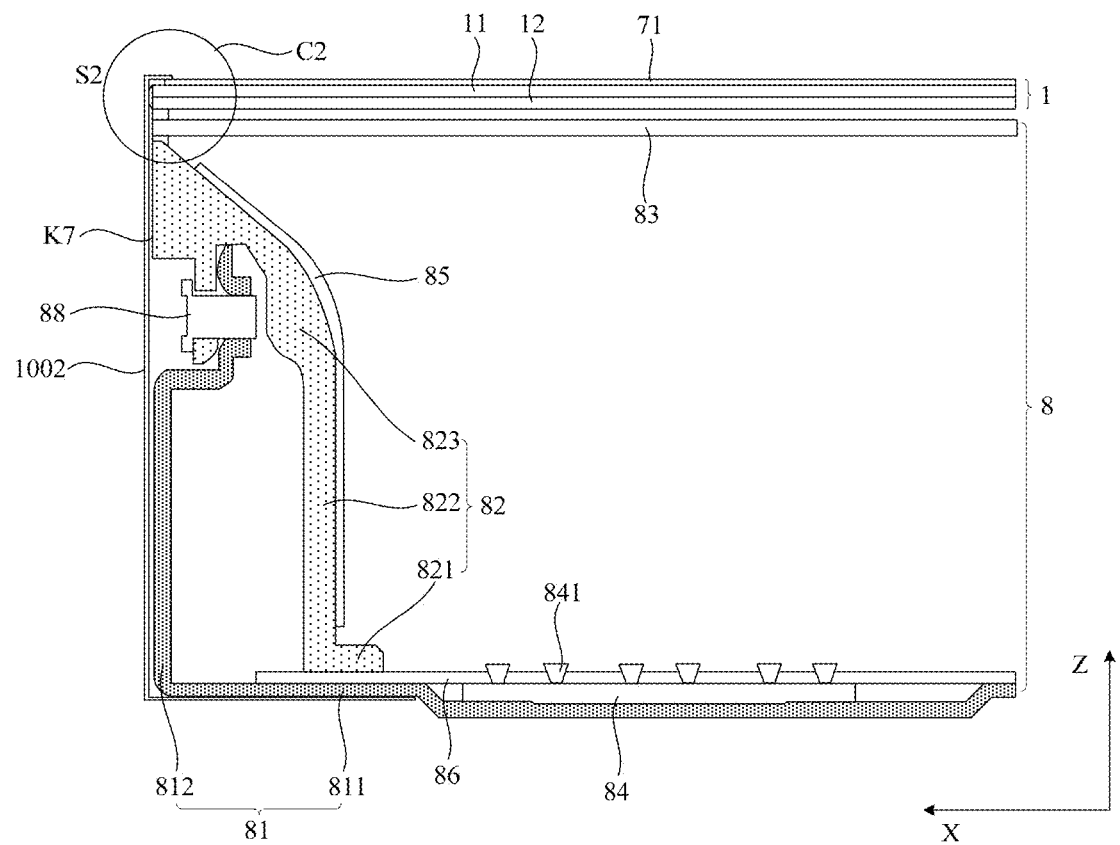
FIG. 9 is a schematic structural diagram illustrating a display device according to an embodiment of the present disclosure.

An embodiment of the present disclosure provides a display device. As shown in FIG. 8 and FIG. 9, the display device includes the display panel 1 described above and a light emitting module 8. FIG. 8 is a cross-sectional view of the display device on the first side S1, and FIG. 9 is a cross-sectional view of the display device on the second side S2.

In this embodiment, the display panel 1 is located on a light emitting side of the light emitting module 8, and the array substrate 12 is located between the color filter substrate 11 and the light emitting module 8.

In this embodiment, as shown in FIG. 8 and FIG. 9, the light emitting module 8 includes a back plate 81, the middle frame 82, an optical film layer 83, a light plate 84, a first reflective film layer 85, a third reflective film layer 86, a second fastener 88, the protection plate 89 and a support block 810.

In this embodiment, as shown in FIG. 8 and FIG. 9, the back plate 81 includes a bottom plate 811 and a side wall 812. The light plate 84 is located on a side of the bottom plate 811 facing the display panel 1, and includes a plurality of light sources 841. The middle frame 82 is disposed around the plurality of light sources 841, and is fixedly connected with the side wall 812. The middle frame 82 is located between the bottom plate 811 and the optical film layer 83.

Figure 10:
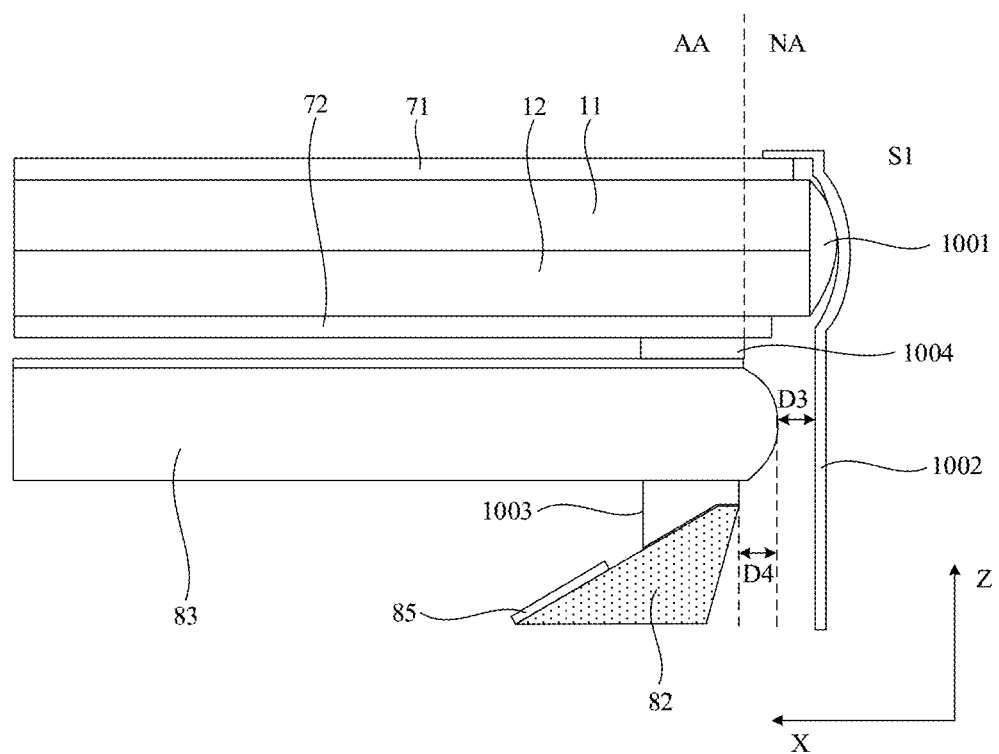
FIG. 10 is a schematic structural diagram illustrating a display device according to an embodiment of the present disclosure.
Figure 11:
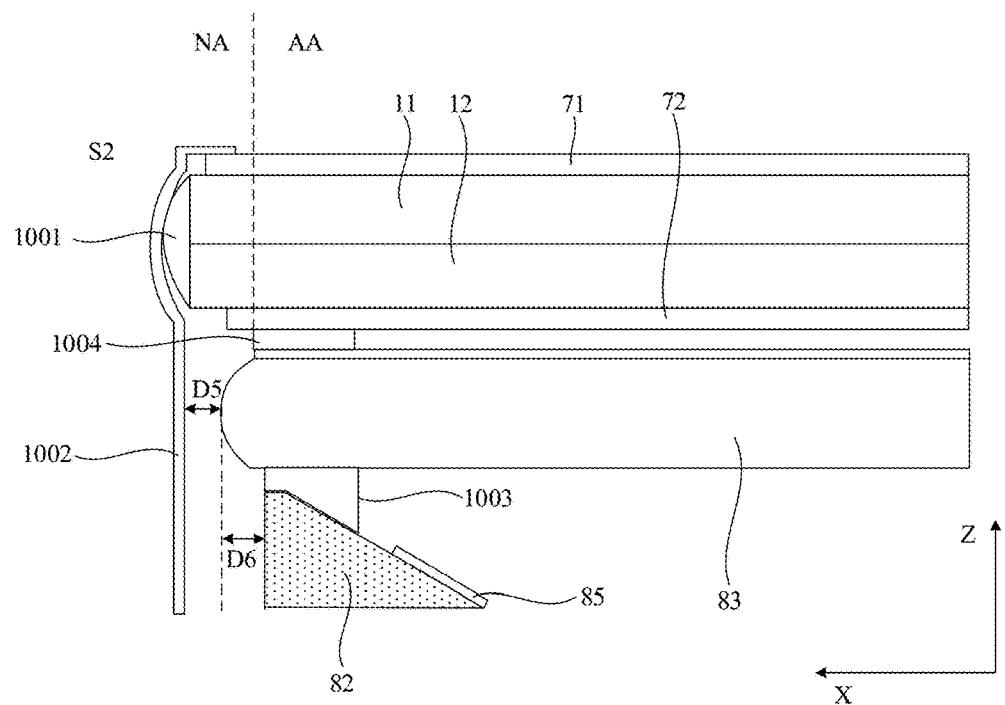
FIG. 11 is a schematic structural diagram illustrating a display device according to an embodiment of the present disclosure.

In this embodiment, as shown in FIG. 10 and FIG. 11, a projection of the optical film layer 83 on the color filter substrate 11 is located within a projection of the array substrate 12 on the color filter substrate 11, and a projection of the middle frame 82 on the array substrate 12 is located within a projection of the optical film layer 83 on the array substrate 12. FIG. 10 is an enlarged schematic diagram of part C1 in FIG. 8. FIG. 11 is an enlarged schematic diagram of part C2 in FIG. 9.

In this embodiment, as shown in FIG. 8 to FIG. 10, the display device further includes a fifth light shielding layer 1001 and a metal layer 1002.

In this embodiment, the fifth light shielding layer 1001 is located on a side surface of the color filter substrate 11 and a side surface of the array substrate 12. The fifth light shielding layer 1001 may be made of a black UV curable adhesive, but is not limited thereto. The fifth light shielding layer 1001 is configured to avoid light from leaking out of the side surface of the color filter substrate 11 and the side surface of the array substrate 12.

In this embodiment, as shown in FIG. 8 to FIG. 10, the metal layer 1002 covers the fifth light shielding layer 1001, and is located on a side surface of the light emitting module 8. A first end of the metal layer 1002 is located on a side of the first polarizer 71 away from the color filter substrate 11, and is located in a peripheral region NA. A second end of the metal layer 1002 is located on a side of the light emitting module 8 away from the display panel 1. The metal layer 1002 is configured to shield light and prevent electromagnetic interference. The metal layer 1002 may be made of aluminum, but is not limited thereto.

In this embodiment, the metal layer 1002 may be a black aluminum foil tape. Since the first end of the metal layer 1002 is attached to the side of the first polarizer 71 away from the color filter substrate 11, and is located in the peripheral region NA, it can be ensured that the metal layer 1002 will not be unglued in a high-temperature and high-humidity environment.

In this embodiment, as shown in FIG. 10, on the first side S1 of the optical film layer 83, in a first direction X, a distance between an edge of the optical film layer 83 and the metal layer 1002 is a third distance D3, and a distance between the middle frame 82 and the edge of the optical film layer 83 is a fourth distance D4. The first direction X is parallel to a surface of the optical film layer 83 facing the display panel 1. The third distance D3 may be equal to the fourth distance D4. The third distance D3 is 0.3~0.5 mm. For example, the third distance D3 may be 0.3 mm, 0.4 mm or 0.5 mm. Thus, a space can be reserved for expansion of the light emitting module in a high-temperature and high-humidity environment, so as to avoid the metal layer 1002 from being unglued.

In this embodiment, as shown in FIG. 11, on the second side S2 of the optical film layer 83, in the first direction X, a distance between an edge of the optical film layer 83 and the metal layer 1002 is a fifth distance D5, and a distance between the middle frame 82 and the edge of the optical film layer 83 is a sixth distance D6. The sixth distance D6 may be greater than or equal to the fifth distance D5. The fifth distance D5 is 0.1~0.3 mm. For example, the fifth distance D5 is 0.1 mm, 0.2 mm or 0.3 mm. The sixth distance D6 is 0.3~0.5 mm. For example, the sixth distance D6 may be 0.3 mm, 0.4 mm or 0.5 mm. Thus, a space can be reserved for expansion of the light emitting module in a high-temperature and high-humidity environment, so as to avoid the metal layer 1002 from being unglued.

It should be noted that a projection of the optical film layer 83 on the array substrate 12 covers the display region AA and a part of the peripheral region NA.

In this embodiment, as shown in FIG. 8, on the first side S1 of the bottom plate 811, the middle frame 82 includes a first side surface K1 and a second side surface K2, where the first side surface K1 is connected with the second side surface K2. The first side surface K1 is an inclined plane. The first side surface K1 is inclined from the peripheral region NA to the display region AA. The second side surface K2 extends along a second direction Z, where the second direction Z is perpendicular to a surface of the optical film layer 83 facing the display panel 1.

In this embodiment, as shown in FIG. 8, a COF 16 is attached on the first side surface K1 and the second side surface K2, where a gate driving chip 161 is located at a connection between the first side surface K1 and the second side surface K2, and a flexible circuit board 162 is attached to the first side surface K1 and the second side surface K2. An acute angle between the first side surface K1 and the second direction Z is greater than an acute angle between the COF 16 and the second direction Z.

In this embodiment, as shown in FIG. 8, a printed circuit board 17 is located on a side of the COFs 16 away from the array substrate 12, and is connected with the COFs 16.

In this embodiment, as shown in FIG. 8, on the first side S1 of the bottom plate 811, the side wall 812 of the back plate 81 includes a first vertical extension portion H1, a first horizontal extension portion H2 and a second vertical extension portion H3. The first vertical extension portion H1 is connected with the bottom plate 811 of the back plate 81, and extends along the second direction Z. The first horizontal extension portion H2 is located between the first vertical extension portion H1 and the second vertical extension portion H3. An extension direction of the first horizontal extension portion H2 is perpendicular to the second direction Z, that is, the first horizontal extension portion H2 extends along the first direction X, and the first horizontal extension portion H2 extends in a direction from the display region AA to the peripheral region NA. The second vertical extension portion H3 extends along the second direction Z. The first horizontal extension portion H2 cooperates with the protection plate 89 to provide a placement space for the printed circuit board 17.

In this embodiment, as shown in FIG. 8, the support block 810 is located at a connection between the first vertical extension portion H1 and the first horizontal extension portion H2, and the support block 810 is located between the first vertical extension portion H1 and the printed circuit board 17 for supporting the printed circuit board 17. The support block 810 may be made of rigid foam for supporting the printed circuit board 17 and playing a buffer role.

In this embodiment, as shown in FIG. 8, the protection plate 89 is located on a side of the printed circuit board 17 away from the support block 810 for protecting the printed circuit board 17. The protection plate 89, the middle frame 82 and the back plate 81 are fixed together.

In this embodiment, as shown in FIG. 8, the protection plate 89 includes a first protection portion 891 and a second protection portion 892, where the first protection portion 891 is connected with the second protection portion 892. The first protection portion 891 extends along the second direction Z. The printed circuit board 17 is located between the first protection portion 891 and the support block 810. An extension direction of the second protection portion 892 is perpendicular to the second direction Z, that is, the second protection portion 892 extends along the first direction X. The second protection portion 892 is located on a side of the printed circuit board 17 away from the display panel 1.

In this embodiment, as shown in FIG. 8, the middle frame 82 includes a first support portion 821, a second support portion 822 and a third support portion 823. The second support portion 822 is located between the first support portion 821 and the third support portion 823. The first support portion 821 is located on the bottom plate 811. An extension direction of the first support portion 821 is perpendicular to the second direction Z, that is, the first support portion 821 extends along the first direction X. The second support portion 822 extends along the second direction Z. The third support portion 823 is configured to support the optical film layer 83.

In this embodiment, a first fastener passes through the second vertical extension portion H3, the third support portion 823 and the first protection portion 891, and fixes the second vertical extension portion H3, the third support portion 823 and the first protection portion 891 together, so as to fix the back plate 81, the middle frame 82 and the protection plate 89 together. The first fastener may be a screw, but is not limited thereto.

In this embodiment, as shown in FIG. 8, a first support point of the third support portion 823 to the optical film layer 83, a second support point of the second support portion 822 to the third support portion 823, and a contact point between the third support portion 823 and the first fastener are vertexes of a mechanical triangle 91. That is, the first support point, the second support point, and the contact point between the third support portion 823 and the first fastener form a mechanical triangle relationship, so as to ensure an overall strength and an architecture stability.

In this embodiment, as shown in FIG. 9, on the second side S2 of the bottom plate 811, a side surface K7 of the middle frame 82 adjacent to the metal layer 1002 is a plane, and extends along the second direction Z. The side wall 812 of the back plate 81 and the middle frame 82 are fixed together through the second fastener 88, where the second fastener 88 may be a screw.

Figure 12:
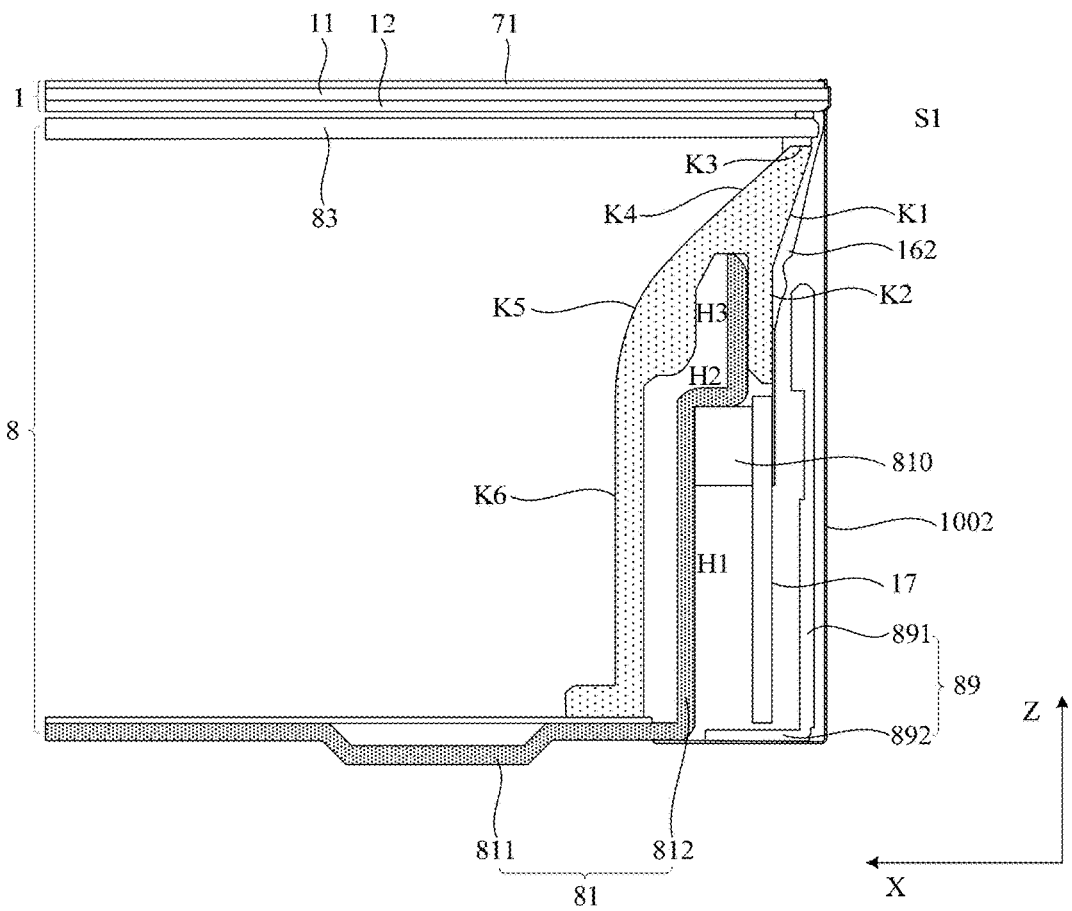
FIG. 12 is a schematic structural diagram illustrating a display device according to an embodiment of the present disclosure.

In this embodiment, as shown in FIG. 12, the third support portion 823 includes a third side surface K3, a fourth side surface K4 and a fifth side surface K5, where the third side surface K3, the fourth side surface K4 and the fifth side surface K5 face the optical film layer 83. The fourth side surface K4 is located between the third side surface K3 and the fifth side surface K5. The third side surface K3 is a plane for supporting the optical film layer 83, and extends along the first direction X. An angle between the fourth side surface K4 and a surface of the optical film layer 83 facing the middle frame 82 is an acute angle. The fifth side surface K5 is a convex arc surface.

In this embodiment, a width of the third side surface K3 in the first direction X is 0.2~0.3 mm, for example, 0.2 mm, 0.25 mm or 0.3 mm. In this way, when the middle frame 82 is attached with the optical film layer 83, an effective width of an adhesive bearing surface for one attachment can be ensured.

In this embodiment, the angle between the fourth side surface K4 and the surface of the optical film layer 83 facing the middle frame 82 is 23~33 degrees, for example, 23 degrees, 30 degrees or 33 degrees.

In this embodiment, a radius of a sphere where the convex arc surface is located is 10~15 mm, for example, 10 mm, 12.5 mm or 15 mm.

In this embodiment, as shown in FIG. 12, the second support portion 822 includes a sixth side surface K6, where the sixth side surface K6 is located on a side of the second support portion 822 facing the optical film layer 83. The sixth side surface K6 is a plane. A length of the sixth side surface K6 in the second direction Z is 14.5 mm, but is not limited thereto.

In this embodiment, a rounded transition between the third side surface K3 of the middle frame 82 facing the optical film layer 83 and the fifth side surface K5 is achieved through the fourth side surface K4, which can ensure uniform light transition and avoid generation of bright lines.

In this embodiment, a distance between a surface of the light plate 84 facing the optical film layer 83 and a surface of the optical film layer 83 facing the light plate 84 is 30 mm, but is not limited thereto.

In this embodiment, as shown in FIG. 10 and FIG. 11, the display device further includes a first adhesive layer 1003 and a second adhesive layer 1004.

In this embodiment, as shown in FIG. 10 and FIG. 11, the first adhesive layer 1003 is located between the middle frame 82 and the optical film layer 83, and a thickness of the first adhesive layer 1003 is 0.15~0.25 mm, for example, 0.15 mm, 0.20 mm or 0.25 mm. The first adhesive layer 1003 may be made of a water adhesive, for example, a hot melt adhesive or an optical curable adhesive, but are not limited thereto. For example, a top end surface of the middle frame 82 may be coated with the hot melt adhesive for fixing an edge of the optical film layer 83 to the top end surface of the middle frame 82, where the third side surface K3 is the top end surface of the middle frame 82. The hot melt adhesive or the optical curable adhesive includes a resin material, and a transmittance of the hot melt adhesive or the optical curable adhesive is 80%~99.5%, for example, 80%, 90%, 95% or 99.5%, but is not limited thereto.

In this embodiment, as shown in FIG. 10 and FIG. 11, the second adhesive layer 1004 is located between the optical film layer 83 and the display panel 1, and a thickness of the second adhesive layer 1004 is 0.1~0.2 mm, for example, 0.1 mm, 0.15 mm or 0.2 mm. The second adhesive layer 1004 may be made of a water adhesive, for example, an optical curable adhesive. That is, an edge of a second polarizer 72 is coated with the optical curable adhesive. Since the second polarizer 72 is fixed on the array substrate 12, and the array substrate 12 and the color filter substrate 11 are fixed together, the optical curable adhesive is used to fix the array substrate 12 and the color filter substrate 11 on the optical film layer 83. The optical curable adhesive includes a resin material, and a transmittance of the optical curable adhesive is 80%~99.5%, for example, 80%, 90%, 95% or 99.5%, but is not limited thereto. The optical curable adhesive may be a UV curable adhesive, but is not limited thereto.

In this embodiment, during manufacturing of the first adhesive layer 1003, an adhesive coating speed of an adhesive coating machine can be set to 40~50 mm/s, an adhesive coating width can be set to 0.6~0.8 mm, and an adhesive coating thickness can be set to 0.2~0.4 mm. For example, the adhesive coating speed of the adhesive coating machine may be set to 40 mm/s, 45 mm/s or 50 mm/s, the adhesive coating width may be set to 0.6 mm, 0.7 mm or 0.8 mm, and the adhesive coating thickness may be set to 0.2 mm, 0.3 mm or 0.4 mm.

In this embodiment, during manufacturing of the second adhesive layer 1004, the adhesive coating speed of the adhesive coating machine can be set to 60~80 mm/s, the adhesive coating width can be set to 0.6~0.8 mm, and the adhesive coating thickness can be set to 0.2~0.3 mm. For example, the adhesive coating speed of the adhesive coating machine may be set to 60 mm/s, 70 mm/s or 80 mm/s, the adhesive coating width may be set to 0.6 mm, 0.65 mm, 0.7 mm or 0.8 mm, and the adhesive coating thickness may be set to 0.2 mm, 0.3 mm or 0.4 mm.

In this embodiment, the display panel 1, the optical film layer 83, and the middle frame 82 can be assembled and fixed in a manner of water adhesive attachment through automation equipment (adhesive coating machine).

In this embodiment, the optical film layer 83 may include a light transmitting glass plate, a light diffusing film and a brightness enhancement film, where the light diffusing film is located on a side of the light transmitting glass plate away from the array substrate 12, and the brightness enhancement film is located on a side of the light transmitting glass plate facing the array substrate 12. A side of the light diffusing film and the top end surface of the middle frame 82 are adhesively fixed through the hot melt adhesive. The brightness enhancement film and the light diffusing film may be formed directly on both sides of the light transmitting glass plate in a manner of coating, or the brightness enhancement film and the light diffusing film may be formed separately, and then the brightness enhancement film and the light diffusing film can be respectively fixed or adhered to both sides of the light transmitting glass plate.

In this embodiment, as shown in FIG. 8, FIG. 9 and FIG. 12, the first reflective film layer 85 is located on a surface of the middle frame 82 facing the optical film layer 83. The first reflective film layer 85 covers the fifth side surface K5, a part of the fourth side surface K4 and a part of the sixth side surface of the middle frame 82. The first reflective film layer 85 may be a reflective sticker, which can reduce a cost. In an embodiment, the first reflective film layer 85 may be a white film layer manufactured by a paint baking process.

In this embodiment, the reflective sticker is made of a composite material, and the reflective sticker includes a reflective material layer and a transparent diffusion layer, where the reflective material layer is close to the middle frame 82, and the transparent diffusion layer is far away from the middle frame 82. A reflectance of the reflective material layer is 75%, but is not limited thereto.

In this embodiment, as shown in FIG. 8, FIG. 9, FIG. 12 and FIG. 13, on a side of the middle frame 82 close to the optical film layer 83, there exists a gap between the first reflective film layer 85 and the third side surface K3. Thus, it can be avoided a phenomenon that edges of a picture are bright due to reduction in a stroke of light close to the optical film layer 83 after reflection.

Figure 13:
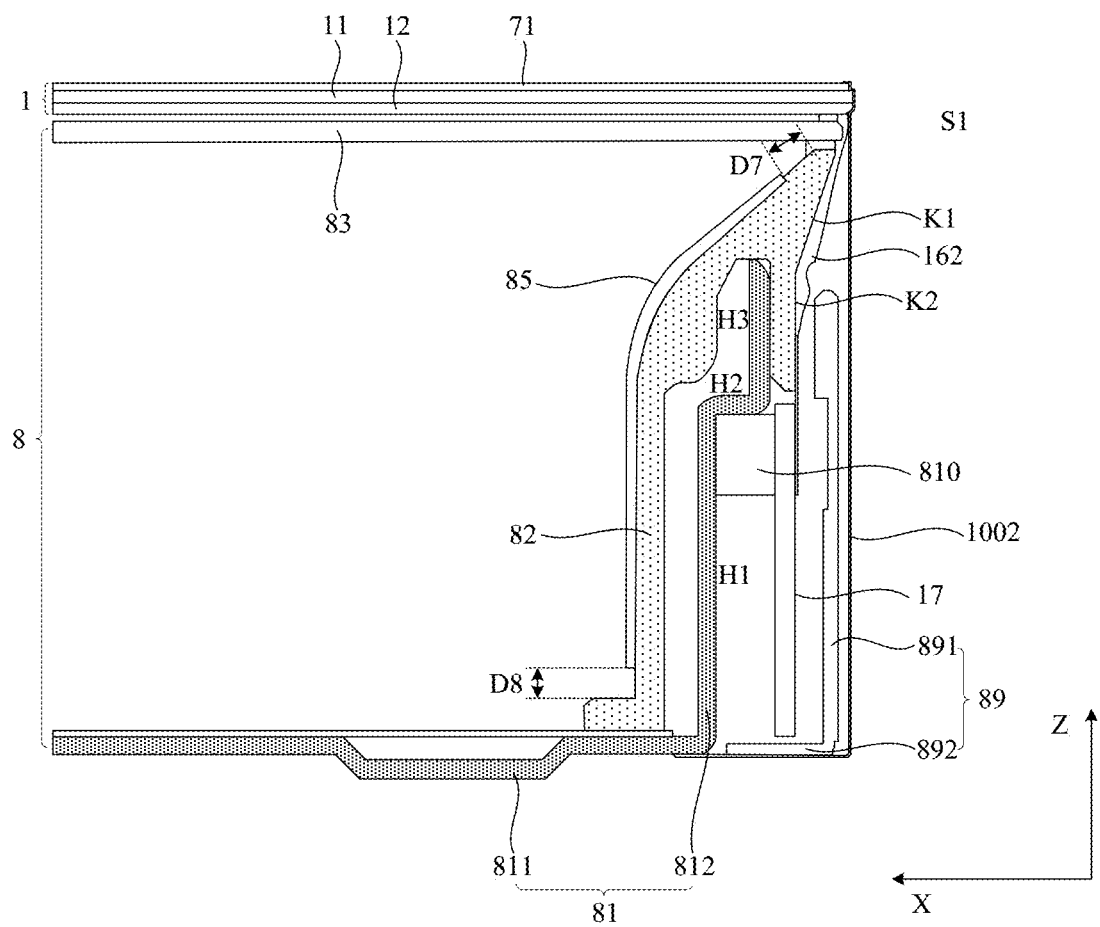
FIG. 13 is a schematic structural diagram illustrating a display device according to an embodiment of the present disclosure.

In this embodiment, as shown in FIG. 13, on the side of the middle frame 82 close to the optical film layer 83, a distance D7 between the first reflective film layer 85 and the third side surface K3 is 2.5 to 5 mm, for example, 2.5 mm, 3 mm or 5 mm.

In this embodiment, as shown in FIG. 8, FIG. 9, FIG. 12 and FIG. 13, on a side of the middle frame 82 close to the bottom plate 811, there exists a gap between the first reflective film layer 85 and the first support portion 821. Thus, it is convenient to paste the reflective sticker on the middle frame 82, and wrinkling on a side of the reflective sticker close to the bottom plate 811 can be avoided.

In this embodiment, as shown in FIG. 13, on the side of the middle frame 82 close to the bottom plate 811, a distance D8 between the first reflective film layer 85 and the first support portion 821 is less than or equal to 2 mm, for example, 0.5 mm, 1 mm or 2 mm.

In this embodiment, there are four middle frames 82. Every two of the four middle frames 82 are adjacent to each other, and the four middle frames 82 enclose a quadrilateral, for example, a rectangle. Two adjacent middle frames 82 are fixedly connected with each other.

Figure 14:
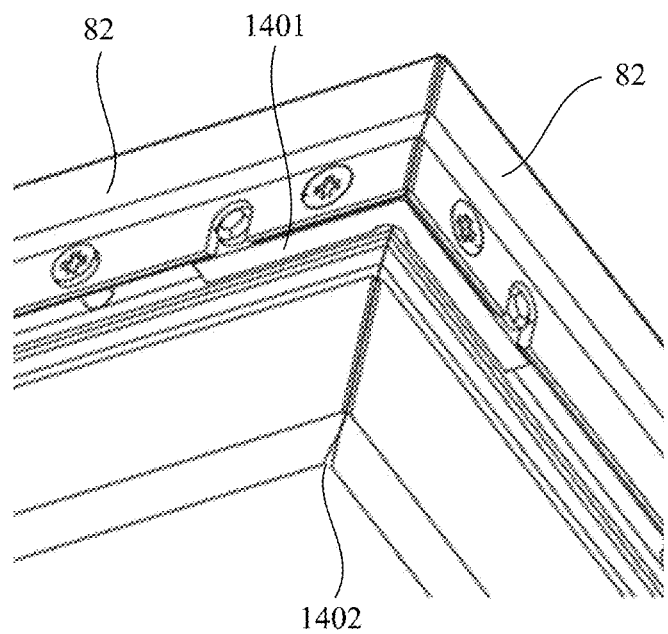
FIG. 14 is a schematic structural diagram illustrating a display device according to an embodiment of the present disclosure.

In this embodiment, as shown in FIG. 14, the light emitting module 8 further includes an embedded corner block 1401, where the embedded corner block 1401 is configured to fixedly connect two adjacent middle frames 82. Therefore, in this embodiment, the light emitting module 8 may include four embedded corner blocks 1401.

Figure 15:
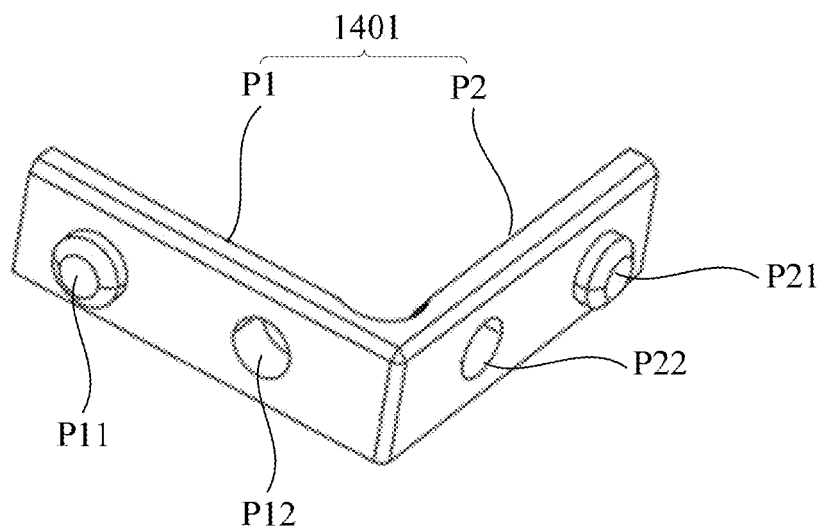
FIG. 15 is a schematic structural diagram illustrating a display device according to an embodiment of the present disclosure.

In this embodiment, as shown in FIG. 15, the embedded corner block 1401 includes a first connection portion P1 and a second connection portion P2, where the first connection portion P1 is connected with the second connection portion P2, and an extension direction of the first connection portion P1 intersects with an extension direction of the second connection portion P2. The first connection portion P1 is fixedly connected with one of two adjacent middle frames 82, and the second connection portion P2 is fixedly connected with the other one of the two adjacent middle frames 82.

In this embodiment, one of two adjacent middle frames 82 includes a first positioning hole, and the other one of the two adjacent middle frames 82 includes a second positioning hole. In this embodiment, as shown in FIG. 15, the first connection portion P1 includes a first positioning column P11, and the second connection portion P2 includes a second positioning column P21. The first positioning column P11 is located in the first positioning hole, and the second positioning column P21 is located in the second positioning hole. Thus, by using the positioning columns to cooperate with the positioning holes, precise positioning can be performed during assembly of middle frames 82.

In this embodiment, as shown in FIG. 15, the first connection portion P1 includes a first screw hole P12, and the second connection portion P2 includes a second screw hole P22. In this way, two countersunk guide screws can be used to lock one embedded corner block 1401 and two middle frames 82 together through the first screw hole P12 and the second screw hole P22 respectively. Therefore, it can be ensured that a gap between inner surfaces of a corner after two adjacent middle frames 82 are connected is smaller than 0.1 mm.

In this embodiment, one of two adjacent middle frames 82 includes a first groove, and the other one of the two adjacent middle frames 82 includes a second groove. The first connection portion P1 is located in the first groove, and a depth of the first groove is the same as a thickness of the first connection portion P1. The second connection portion P2 is located in the second groove, and a depth of the second groove is the same as a thickness of the second connection portion P2. In this way, when the two adjacent middle frames 82 are fixedly connected with each other through the embedded corner block 1401, surfaces of the embedded corner block 1401 away from the middle frames 82 are substantially flush with surfaces of the middle frames 82 except the first groove and the second groove, so that inner walls of the middle frames 82 can be kept as smooth as possible to avoid affecting a uniformity of light emitted from the light emitting module 8.

In this embodiment, as shown in FIG. 14, there exists an opening 1402 on a side close to the bottom plate 811 between two adjacent middle frames 82. The opening 1402 can be acquired by cutting bottom edges of two adjacent middle frames 82 on the side close to the bottom plate 811. Since there exists the opening 1402 on the side close to the bottom plate 811 between two adjacent middle frames 82, it can be avoided that fluctuations in a size of the middle frames 82 on the side close to the bottom plate 811 affect an assembly gap of optical reflective surfaces.

Figure 16:
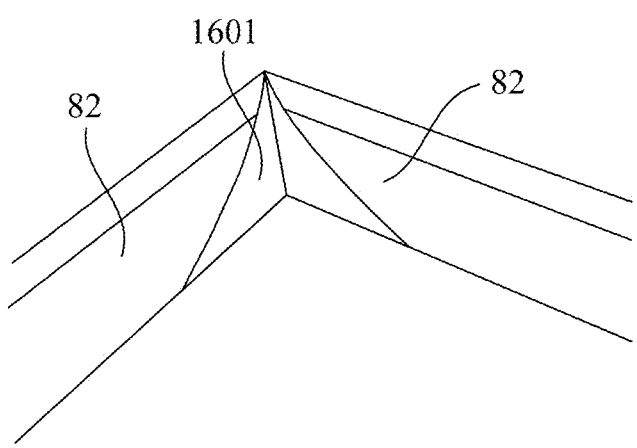
FIG. 16 is a schematic structural diagram illustrating a display device according to an embodiment of the present disclosure.

In this embodiment, as shown in FIG. 16, the light emitting module 8 further includes a second reflective film layer 1601, where the second reflective film layer 1601 is located at a connection between two adjacent middle frames 82, and a width of the second reflective film layer 1601 increases in a direction from the optical film layer 83 to the bottom plate 811. Thus, it can be avoided a phenomenon that a light intensity of the light emitting module 8 at the connection between two adjacent middle frames 82 is weaker, and a uniformity of light emission can be improved.

In this embodiment, as shown in FIG. 9, the third reflective film layer 86 is located on a side of the light plate 84 facing the optical film layer 83 for reflecting light emitted from the light sources 841 toward the third reflective film layer 86 to the optical film layer 83, so that a light efficiency is improved. The third reflective film layer 86 is located between the light plate 84 and the middle frame 82, that is, the third reflective film layer 86 is pressed on a bottom end of the first support portion 821. The middle frame 82 can serve to fix the third reflective film layer 86, so as to avoid the third reflective film layer 86 from warping due to heat generated when the light sources 841 emit light, thereby avoiding non-uniform reflected light caused by the warpage and influence on the light efficiency.

Figure 17:
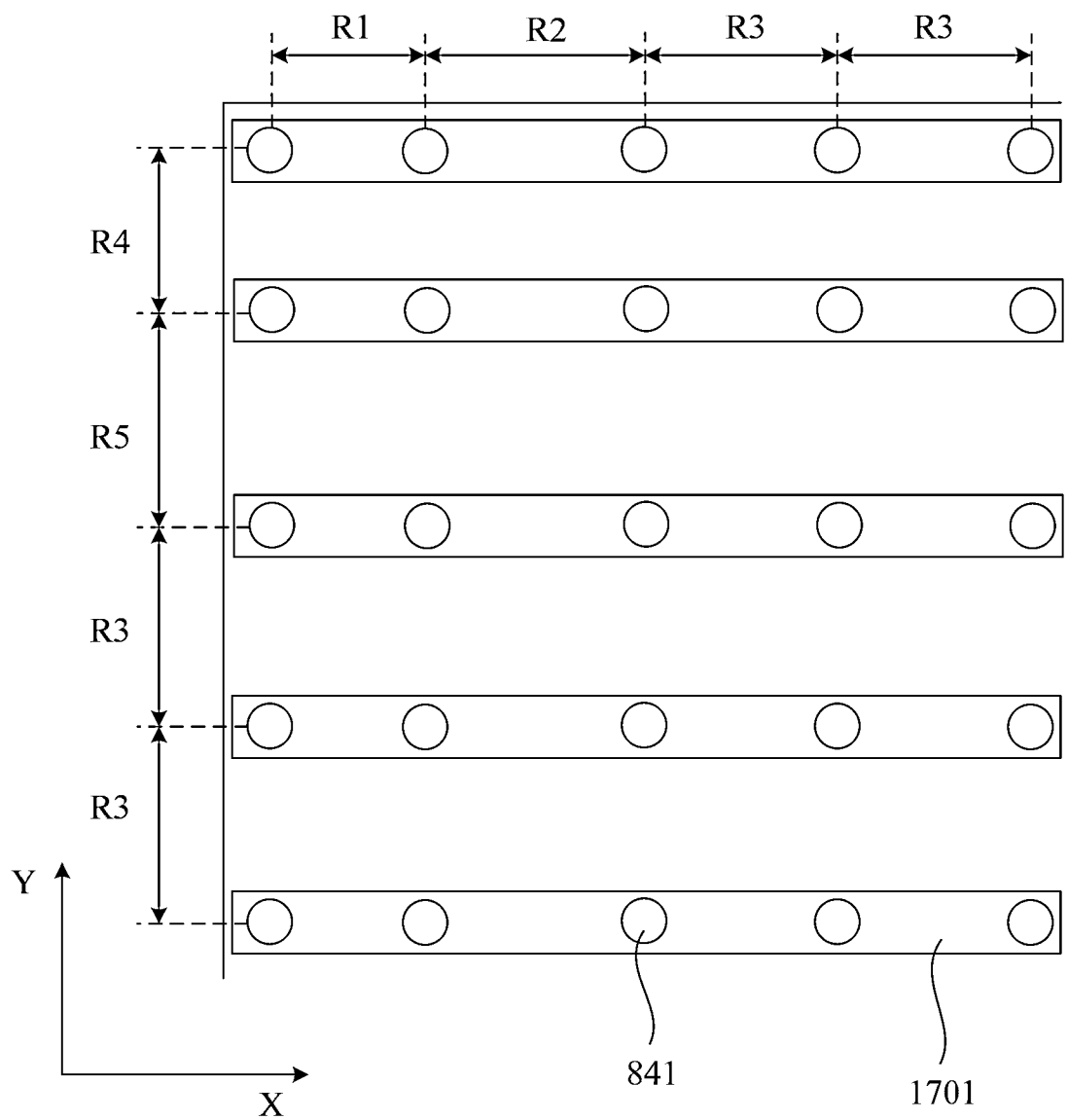
FIG. 17 is a schematic structural diagram illustrating a display device according to an embodiment of the present disclosure.

In this embodiment, as shown in FIG. 17, a plurality of light sources 841 are arranged in an array. In this embodiment, a light source 841 array formed by the plurality of light sources 841 is symmetrical. FIG. 17 shows a part of light sources 841 in the light source 841 array.

In this embodiment, as shown in FIG. 17, the light source 841 array includes M rows of light sources 841 arranged along the first direction X, and N rows of light sources 841 arranged along a third direction Y, where M and N are integers greater than 6 respectively, and the first direction X intersects with the third direction Y. That is, in the first direction X, each row of light sources 841 includes N light sources 841, and in the third direction Y, each row of light sources 841 includes M light sources 841. In the first direction X, each row of light sources 841 may be located on a same light bar 1701. In this embodiment, M is 8, and N is 14.

In this embodiment, as shown in FIG. 17, in the first direction X, a light distance between a first light source 841 and a second light source 841 is a first light distance R1, a light distance between the second light source 841 and a third light source 841 is a second light distance R2, a light distance between an $(N-2)^{th}$ light source 841 and an $(N-1)^{th}$ light source 841 is the second light distance R2, a light distance between the $(N-1)^{th}$ light source 841 and an $N^{th}$ light source 841 is the first light distance R1, and a light distance between two adjacent light sources 841 in remaining light sources 841 is a third light distance R3. The second light distance R2 is greater than the third light distance R3, and the third light distance R3 is greater than the first light distance R1. The first light distance R1 may be 60 mm, the second light distance R2 may be 85 mm, and the third light distance R3 may be 75 mm, but they are not limited thereto.

Since, in the first direction X, the first light source 841 and the $N^{th}$ light source 841 are closely adjacent to the middle frame 82, and a surface of the middle frame 82 facing the light sources 841 is a reflective surface, an intensity of light emission at positions corresponding to the first light source 841 and the $N^{th}$ light source 841 on the light emitting module 8 may be caused to be smaller. By shortening the light distance between the second light source 841 and the first light source 841 and the light distance between the $(N-1)^{th}$ light source 841 and the $N^{th}$ light source 841, the intensity of light emission at positions corresponding to the first light source 841 and the $N^{th}$ light source 841 on the light emitting module 8 and the uniformity of light emitted from the light emitting module 8 can be improved.

Furthermore, since light reflected from the reflective surface of the middle frame 82 may fall at positions corresponding to the second light source 841 and the $(N-1)^{th}$ light source 841 on the light emitting module 8, a light intensity at the positions corresponding to the second light source 841 and the $(N-1)^{th}$ light source 841 on the light emitting module 8 is enhanced. By increasing the light distance between the second light source 841 and the third light source 841 and the light distance between the $(N-2)^{th}$ light source 841 and the $(N-1)^{th}$ light source 841, the light intensity at the positions corresponding to the second light source 841 and the $(N-1)^{th}$ light source 841 on the light emitting module 8 can be reduced, and the uniformity of light emitted from the light emitting module 8 can be improved.

In this embodiment, as shown in FIG. 17, in the third direction Y, a light distance between a first light source 841 and a second light source 841 is a fourth light distance R4, a light distance between the second light source 841 and a third light source 841 is a fifth light distance R5, a light distance between an $(N-2)^{th}$ light source 841 and an $(N-1)^{th}$ light source 841 is the fifth light distance R5, a light distance between the $(N-1)^{th}$ light source 841 and an $N^{th}$ light source 841 is the fourth light distance R4, and a light distance between two adjacent light sources 841 in remaining light sources 841 is the third light distance R3. The fifth light distance R5 is greater than the third light distance R3, and the third light distance R3 is greater than the fourth light distance R4. The fourth light distance R4 is 62.5 mm, and the fifth light distance R5 is 82 mm, but they are not limited thereto. Similarly, in the third direction Y, non-equidistant arrangement of the light sources 841 can improve the uniformity of light emitted from the light emitting module 8.

Figure 18:
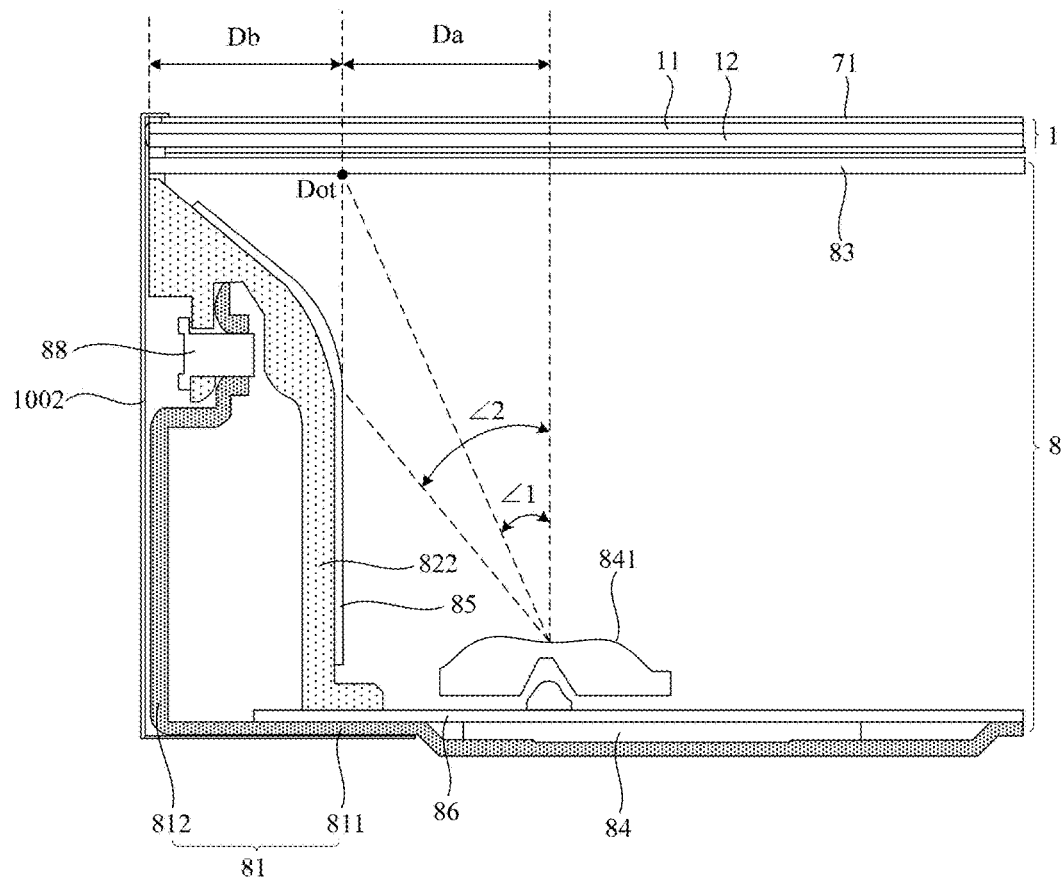
FIG. 18 is a schematic structural diagram illustrating a display device according to an embodiment of the present disclosure.

In this embodiment, as shown in FIG. 18, in any one of the first direction X and the third direction Y, a distance between a side of the first reflective film layer 85 on the second support portion 822 facing the optical film layer 83 and a light source 841 adjacent to the second support portion 822 is a seventh distance Da, and a distance between the side of the first reflective film layer 85 on the second support portion 822 facing the optical film layer 83 and an edge of the optical film layer 83 close to the middle frame 82 is an eighth distance Db. A projection of a surface of the second support portion 822 facing the optical film layer 83 on the optical film layer 83 is a projection point Dot. An acute angle between the second direction Z and a line between the light source 841 adjacent to the second support portion 822 and the projection point Dot is a first angle 21. An acute angle between the second direction Z and a line between the light source 841 adjacent to the second support portion 822 and a connection point of the second support portion 822 and the third support portion 823 is a second angle 22. A reflectance of a surface of the third support portion 823 facing the optical film layer 83, a luminous flux per unit angle of the light source 841 at different angles of light emission, the seventh distance Da, the eighth distance Db, the first angle 21 and the second angle 22 satisfy the following relationship:

$$\frac{a}{b} \approx \frac{\int_0^\alpha x\,dr}{\int_\alpha^\beta fx\,dr} \tag{1}$$

Where a is a value of the seventh distance Da, b is a value of the eighth distance Db, $\alpha$ is a value of the first angle $\angle 1$, $\beta$ is a value of the second angle $\angle 2$, x is the luminous flux per unit angle of the light source 841 at different angles of light emission, and r is an angle of light emission.

Figure 19:
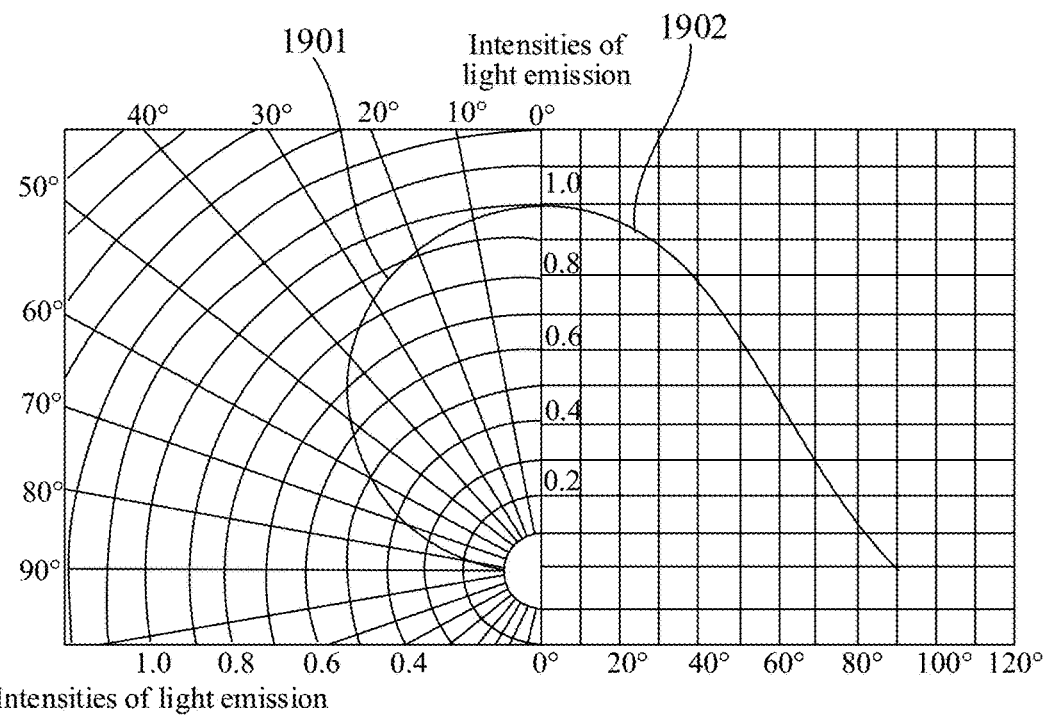
FIG. 19 is a schematic diagram illustrating relationship curves between intensities and angles of light emission according to an embodiment of the present disclosure.

In this embodiment, as shown in FIG. 19, intensities of light emitted from the light sources 841 attenuate with angles of light emission. FIG. 19 shows a relationship curve 1901 between intensities and angles of light emitted from the light sources 841 in a polar coordinate system on its left side. FIG. 19 shows a relationship curve 1902 between intensities and angles of light emitted from the light sources 841 in a rectangular coordinate system on its right side. A horizontal axis in the polar coordinate system represents an intensity of light emission, and its unit is degree. A horizontal axis in the rectangular coordinate system represents an angle of light emission, and its unit is degree; a vertical axis in the rectangular coordinate system represents an intensity of light emission, and its unit is 1. According to the relationship curve 1901/1902 between the intensities and the angles of light emission, luminous fluxes per unit angle of the light sources 841 at different angles of light emission can be determined.

In this embodiment, the above relationship formula (1) and the relationship curve 1901/1902 between intensities and angles of light emission can be used to determine the value of the seventh distance Da. The value of the seventh distance Da may be 15~20 mm, for example, 15 mm, 18 mm or 20 mm.

It should be noted that the value of the seventh distance Da can be acquired by an experimental method, and is not limited to the above method.

In this embodiment, since the first conductive portion 13 is provided on the side surface of the array substrate 12 and the side surface of the color filter substrate 11, and the first conductive portion 13 is connected with the pixel circuits through the second conductive portion 14, the pixel circuits can be connected with a chip for controlling the pixel circuits through the first conductive portion 13. And since the first conductive portion 13 is located on the side surface of the array substrate 12 and the side surface of the color filter substrate 11, a space on the array substrate 12 located in the peripheral region NA can be avoided from being occupied, and a width of the peripheral region NA can be reduced, which is beneficial to realizing a narrow bezel and increasing a screen-to-body ratio. Furthermore, the width of the peripheral region NA can be reduced to less than 1 mm. Therefore, by applying the display panel 1 to display devices in a spliced display device, a seam between two adjacent display devices in the spliced display device can be reduced.

An embodiment of the present disclosure provides a spliced display device. The spliced display device includes at least two display devices, where at least one of the at least two display devices is the above-described display device.

In this embodiment, each display device in the spliced display device includes the above-described display device. The above-described display device may be a liquid crystal display device, but is not limited thereto.

In this embodiment, since the first conductive portion 13 is provided on the side surface of the array substrate 12 and the side surface of the color filter substrate 11, and the first conductive portion 13 is connected with the pixel circuits through the second conductive portion 14, the pixel circuits can be connected with a chip for controlling the pixel circuits through the first conductive portion 13. And since the first conductive portion 13 is located on the side surface of the array substrate 12 and the side surface of the color filter substrate 11, a space on the array substrate 12 located in the peripheral region NA can be avoided from being occupied, and a width of the peripheral region NA can be reduced. Therefore, a seam between two adjacent display devices in the spliced display device can be reduced.

Of course, in other embodiments, there may exist one, two or other number of display devices in the spliced display device, including the above-described display device.

Figure 20:
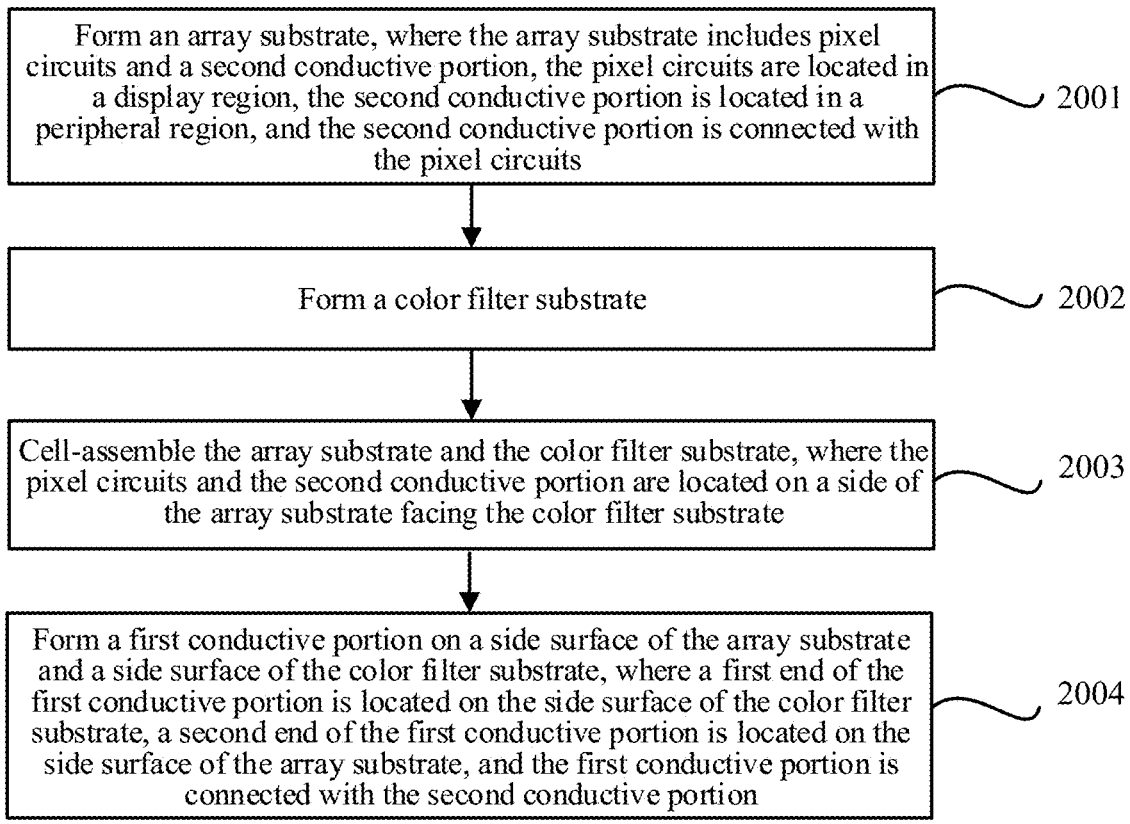
FIG. 20 is a schematic flowchart illustrating a method of manufacturing a display panel according to an embodiment of the present disclosure.
Figure 21:
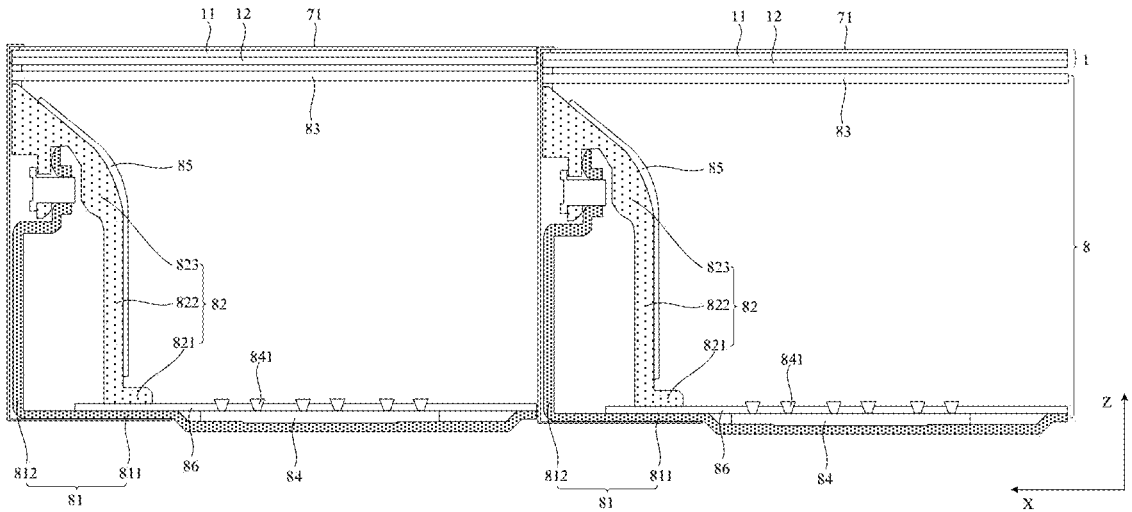
FIG. 21 is a schematic structural diagram illustrating a spliced display device according to an embodiment of the present disclosure.

An embodiment of the present disclosure provides a method of manufacturing a display panel 1, which is used for manufacturing the above-described display panel 1. As shown in FIG. 20, the method of manufacturing the display panel 1 includes the following steps 2001-2004.

At step 2001, an array substrate 12 is formed, where the array substrate 12 includes pixel circuits and a second conductive portion 14, the pixel circuits are located in a display region AA, the second conductive portion 14 is located in a peripheral region NA, and the second conductive portion 14 is connected with the pixel circuits.

At step 2002, a color filter substrate 11 is formed.

At step 2003, the array substrate 12 and the color filter substrate 11 are cell-assembled, and the pixel circuits and the second conductive portion 14 are located on a side of the array substrate 12 facing the color filter substrate 11.

In this embodiment, after the array substrate 12 and the color filter substrate 11 are cell-assembled, and before a first conductive portion 13 is formed on a side surface of the array substrate 12 and a side surface of the color filter substrate 11, impurities such as glass residues on a surface of the second conductive portion 14 may be first removed in a manner of thermal shock through UV laser, so as to enhance conductivity and adhesion of contact between the first conductive portion 13 and the second conductive portion 14.

At step 2004, a first conductive portion 13 is formed on a side surface of the array substrate 12 and a side surface of the color filter substrate 11, where a first end E1 of the first conductive portion 13 is located on the side surface of the color filter substrate 11, a second end E2 of the first conductive portion 13 is located on the side surface of the array substrate 12, and the first conductive portion 13 is connected with the second conductive portion 14.

In this embodiment, in step 2004, the first conductive portion 13 may be first manufactured, and then the first conductive portion 13 may be transfer printed on the side surface of the array substrate 12 and the side surface of the color filter substrate 11 through a transfer printing process.

In this embodiment, conductive silver paste/slurry can be injected into a high-precision screen to form the first conductive portion 13, and then the first conductive portion 13 is transfer printed on the side surface of the array substrate 12 and the side surface of the color filter substrate 11 through a silicone pad.

In this embodiment, after the first conductive portion 13 is transfer printed on the side surface of the array substrate 12 and the side surface of the color filter substrate 11 through the silicone pad, the first conductive portion 13 can be thermally cured through infrared laser.

In this embodiment, after the first conductive portion 13 is thermally cured through the infrared laser, COFs 16 can be bound/bonded to a side edge of the display panel 1 through a conductive film layer 15 at a certain temperature, time and pressure.

In this embodiment, the COFs 16 can be bound/bonded to a printed circuit board 17 through a conductive adhesive at a certain temperature, time and pressure.

Although the present disclosure is disclosed above, the present disclosure is not limited thereto. Any person skilled in the art can make various changes and modifications without departing from the spirit and scope of the present disclosure. Therefore, the protection scope of the present disclosure should be based on the scope defined by the claims.

The invention claimed is:

1. A display panel, comprising:
   a display region and a peripheral region surrounding the display region;
   a color filter substrate comprising a first central region and a first edge region surrounding the first central region;
   an array substrate opposite to the color filter substrate and comprising:
   a second central region and a second edge region surrounding the second central region,
   pixel circuits in the display region, and
   a second conductive portion, in the peripheral region and connected with the pixel circuits,
   wherein the pixel circuits and the second conductive portion are on a side of the array substrate facing the color filter substrate;
   a first conductive portion on a side surface of the array substrate and a side surface of the color filter substrate, wherein a first end of the first conductive portion is on the side surface of the color filter substrate, a second end of the first conductive portion is on the side surface of the array substrate, and the first conductive portion is connected with the second conductive portion;

a first polarizer on a side of the color filter substrate away from the array substrate, wherein a projection of the first polarizer onto the color filter substrate is within the first central region;

a second polarizer on a side of the array substrate away from the color filter substrate, wherein a projection of the second polarizer onto the array substrate is within the second central region;

a first light shielding layer on a side of the color filter substrate facing the first polarizer, wherein the first light shielding layer is in the first edge region and covers side surfaces of the first polarizer;

a second light shielding layer on a side of the array substrate facing the second polarizer, wherein the second light shielding layer is in the second edge region and covers side surfaces of the second polarizer;

a first water and oxygen barrier layer covering the first light shielding layer; and a second water and oxygen barrier layer covering the second light shielding layer.

2. The display panel according to claim 1, wherein a distance between the first end of the first conductive portion and the second end of the first conductive portion is smaller than a distance between a first surface of the color filter substrate away from the array substrate and a second surface of the array substrate away from the color filter substrate.

3. The display panel according to claim 1, wherein the first conductive portion is between a first central axis of the side surface of the color filter substrate and a second central axis of the side surface of the array substrate; wherein the first central axis and the second central axis are respectively perpendicular to a direction from the first end of the first conductive portion to the second end of the first conductive portion.

4. The display panel according to claim 3, wherein a distance between the first end of the first conductive portion and the first central axis is a first distance, and a distance between the second end of the first conductive portion and the second central axis is a second distance, wherein the first distance is equal to the second distance.

5. The display panel according to claim 1, further comprising: chip-on-films, wherein the chip-on-films are bonded together with the first conductive portion, and the chip-on-films are electrically connected with the first conductive portion.

6. The display panel according to claim 5, further comprising: a conductive film layer, wherein the conductive film layer is between the first conductive portion and the chip-on-films, and the first conductive portion is in electrical communication with the chip-on-films through the conductive film layer.

7. The display panel according to claim 6, wherein the first conductive portion comprises a plurality of first conductive portions, and the conductive film layer covers the plurality of first conductive portions;

wherein the plurality of first conductive portions comprise a plurality of central conductive portions and a plurality of edge conductive portions, wherein the central conductive portions are in middle of the plurality of first conductive portions, and the edge conductive portions are in edges of the plurality of first conductive portions; and wherein the chip-on-films are connected with the plurality of central conductive portions through the conductive film layer.

8. The display panel according to claim 5, further comprising: a printed circuit board, wherein the printed circuit board is on a side of the chip-on-films away from the array substrate, and is connected with the chip-on-films.

9. The display panel according to claim 8, wherein a width of part of a chip-on-film near the printed circuit board is smaller than a width of part of the chip-on-film near the array substrate.

10. The display panel according to claim 1, wherein the color filter substrate comprises a first edge and a second edge, the first edge is on a first side of the color filter substrate, and the second edge is on a second side of the color filter substrate, the second side is a side other than the first side, and the first conductive portion is on the first side of the color filter substrate;

wherein a distance between a third edge of the first polarizer on the first side and the first edge is 0.05~1.7 mm, and the third edge is parallel to the first edge, a distance between a fourth edge of the first polarizer on the second side and the second edge is 0~0.1 mm, and the fourth edge is parallel to the second edge;

wherein the array substrate comprises a fifth edge and a sixth edge, the fifth edge is on the first side of the array substrate, and the sixth edge is on the second side of the array substrate; and wherein a distance between a seventh edge of the second polarizer on the first side and the fifth edge is 0.1~1.7 mm, the seventh edge is parallel to the fifth edge, a distance between an eighth edge of the second polarizer on the second side and the sixth edge is 0~0.1 mm, and the eighth edge is parallel to the sixth edge.

11. The display panel according to claim 1, wherein the color filter substrate comprises a third light shielding layer and a fourth light shielding layer;

wherein the peripheral region comprises a first sub-region and a second sub-region, the first sub-region is between the display region and the first conductive portion, and the second sub-region is a region other than the first sub-region in the peripheral region;

wherein a projection of the third light shielding layer onto the array substrate is within the first sub-region, and a projection of the fourth light shielding layer onto the array substrate is within the second sub-region; and wherein a width of the third light shielding layer is 0.6~1.0 mm, and a width of the fourth light shielding layer is 0.25~0.5 mm.

12. A display device, comprising:

a light emitting module, and a display panel, comprising:

a display region and a peripheral region surrounding the display region;

a color filter substrate comprising a first central region and a first edge region surrounding the first central region;

an array substrate opposite to the color filter substrate and comprising:

a second central region and a second edge region surrounding the second central region;

pixel circuits in the display region, and a second conductive portion, in the peripheral region and connected with the pixel circuits;

wherein the pixel circuits and the second conductive portion are on a side of the array substrate facing the color filter substrate;

a first conductive portion on a side surface of the array substrate and a side surface of the color filter substrate, wherein a first end of the first conductive portion is on the side surface of the color filter substrate, a second end of the first conductive portion is on the side surface of the array substrate, and the first conductive portion is connected with the second conductive portion;

a first polarizer on a side of the color filter substrate away from the array substrate, wherein a projection of the first polarizer onto the color filter substrate is within the first central region;

a second polarizer on a side of the array substrate away from the color filter substrate, wherein a projection of the second polarizer onto the array substrate is within the second central region;

a first light shielding layer on a side of the color filter substrate facing the first polarizer, wherein the first light shielding layer is in the first edge region and covers side surfaces of the first polarizer;

a second light shielding layer on a side of the array substrate facing the second polarizer, wherein the second light shielding layer is in the second edge region and covers side surfaces of the second polarizer;

a first water and oxygen barrier layer covering the first light shielding layer; and a second water and oxygen barrier layer covering the second light shielding layer;

wherein the display panel is on a light emitting side of the light emitting module, and the array substrate is between the color filter substrate and the light emitting module.

13. The display device according to claim 12, wherein the light emitting module comprises a back plate, a middle frame, an optical film layer and a light plate, wherein
the back plate comprises a bottom plate and a side wall; the light plate is on a side of the bottom plate facing the display panel, and comprises a plurality of light sources; the middle frame is disposed around the plurality of light sources, and is fixedly connected with the side wall; the middle frame is between the bottom plate and the optical film layer.

14. The display device according to claim 13, wherein a projection of the optical film layer onto the color filter substrate is within a projection of the array substrate onto the color filter substrate, and a projection of the middle frame on the array substrate is within a projection of the optical film layer onto the array substrate.

15. The display device according to claim 14, further comprising: a fifth light shielding layer and a metal layer, wherein
the fifth light shielding layer is on a side surface of the color filter substrate and a side surface of the array substrate;
the metal layer covers the fifth light shielding layer, and is on a side surface of the light emitting module; a first end of the metal layer is on a side of the first polarizer away from the color filter substrate and in the peripheral region, and a second end of the metal layer is on a side of the light emitting module away from the display panel.

16. The display device according to claim 15, wherein, on a first side of the optical film layer, in a first direction, a distance between an edge of the optical film layer and the metal layer is a third distance, and a distance between the middle frame and the edge of the optical film layer is a fourth distance, wherein the first direction is parallel to a surface of the optical film layer facing the display panel, the third distance is equal to the fourth distance, and the third distance is 0.3~0.5 mm; and
on a second side of the optical film layer, in the first direction, the distance between the edge of the optical film layer and the metal layer is a fifth distance, and the distance between the middle frame and the edge of the optical film layer is a sixth distance, wherein the sixth distance is greater than or equal to the fifth distance, the fifth distance is 0.1~0.3 mm, and the sixth distance is 0.3~0.5 mm.

17. The display device according to claim 13, wherein, on a first side of the bottom plate, the middle frame comprises a first side surface and a second side surface, wherein the first side surface is connected with the second side surface, the first side surface is an inclined plane inclined from the peripheral region to the display region, and the second side surface extends along a second direction, the second direction is perpendicular to a surface of the optical film layer facing the display panel;
when the display panel comprises chip-on-films, each of the chip-on-films comprises a chip and a flexible circuit board, wherein the chip is fixed on the flexible circuit board; and
the display panel further comprises a printed circuit board, wherein the printed circuit board is on a side of the chip-on-films away from the array substrate, and is connected with the chip-on-films.

18. A spliced display device, comprising the display device according to claim 12 and another display device.

19. A method of manufacturing a display panel, comprising:
forming a display region and a peripheral region surrounding the display region;
forming an array substrate, wherein the array substrate comprises pixel circuits and a second conductive portion, the pixel circuits are in the display region, and the second conductive portion is in the peripheral region and connected with the pixel circuits; wherein the array substrate comprises a second central region and a second edge central region surrounding the second central region;
forming a color filter substrate, wherein the color filter substrate comprises a first central region and a first edge region surrounding the first central region;
cell-assembling the array substrate and the color filter substrate, wherein the pixel circuits and the second conductive portion are on a side of the array substrate facing the color filter substrate; and
forming a first conductive portion on a side surface of the array substrate and a side surface of the color filter substrate, wherein a first end of the first conductive portion is on the side surface of the color filter substrate, a second end of the first conductive portion is on the side surface of the array substrate, and the first conductive portion is connected with the second conductive portion;
forming a first polarizer on a side of the color filter substrate away from the array substrate, wherein a projection of the first polarizer onto the color filter substrate is within the first central region;
forming a second polarizer on a side of the array substrate away from the color filter substrate, wherein a projection of the second polarizer onto the array substrate is within the second central region;

forming a first light shielding layer on a side of the color filter substrate facing the first polarizer, wherein the first light shielding layer is in the first edge region and covers side surfaces of the first polarizer;

forming a second light shielding layer on a side of the array substrate facing the second polarizer, wherein the second light shielding layer is in the second edge region and covers side surfaces of the second polarizer;

forming a first water and oxygen barrier layer covering the first light shielding layer; and forming a second water and oxygen barrier layer covering the second light shielding layer.

20. The method according to claim 19, wherein forming the first conductive portion on the side surface of the array substrate and the side surface of the color filter substrate comprises:

manufacturing the first conductive portion; and transfer printing the first conductive portion on the side surface of the array substrate and the side surface of the color filter substrate through a transfer printing process.

* * * * *